US012770217B2

(12) United States Patent
Do et al.

(10) Patent No.: US 12,770,217 B2
(45) Date of Patent: Oct. 20, 2026

(54) ELECTRONIC DEVICE PERFORMING SCALING USING ARTIFICIAL INTELLIGENCE MODEL AND METHOD FOR OPERATING THE SAME

(71) Applicant: Samsung Electronics Co., Ltd., Suwon-si (KR)

(72) Inventors: Taewon Do, Suwon-si (KR); Yongtae Kim, Suwon-si (KR); Hoonjae Lee, Suwon-si (KR); Gautam Tushar, Suwon-si (KR); Hyeyoung Jun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 397 days.

(21) Appl. No.: 18/518,787

(22) Filed: Nov. 24, 2023

(65) Prior Publication Data

US 2024/0177268 A1 May 30, 2024

Related U.S. Application Data

(63) Continuation of application No. PCT/KR2023/019076, filed on Nov. 24, 2023.

(30) Foreign Application Priority Data

Nov. 24, 2022 (KR) ........................ 10-2022-0158847
Dec. 19, 2022 (KR) ........................ 10-2022-0178075

(51) Int. Cl.
*G06T 3/4046* (2024.01)
*G06T 5/50* (2006.01)

(52) U.S. Cl.
CPC .............. *G06T 3/4046* (2013.01); *G06T 5/50* (2013.01)

(58) Field of Classification Search
CPC ......... G06T 3/4046; G06T 5/50; G06N 3/045; G06N 3/0464; G06N 3/08; G06N 3/098;
(Continued)

(56) References Cited

U.S. PATENT DOCUMENTS 10,986,356 B2 4/2021 Kim et al.
2011/0279640 A1* 11/2011 Choi ...................... H04N 7/147 348/14.12

(Continued)

FOREIGN PATENT DOCUMENTS

KR 10-2011-0125823 A 11/2011
KR 10-2017-0094745 A 8/2017

(Continued)

OTHER PUBLICATIONS

International Search Report dated Feb. 27, 2024, issued in International Patent Application No. PCT/KR2023/019076.

*Primary Examiner* — Mekonen T Bekele
(74) *Attorney, Agent, or Firm* — Jefferson IP Law, LLP

(57) ABSTRACT

An electronic device is provided. The electronic device includes memory, a camera module, a communication module, and at least one processor operatively connected to the memory, the camera module, and the communication module. The memory, when executed by the at least one processor, cause the electronic device to establish a call connection with a network based on the communication module, identify a first image captured based on the camera module, identify first information associated with a first bitrate corresponding to the first image, based on a communication environment between the network and the electronic device, identify a second image corresponding to the first image output from an artificial intelligence model for down-scaling, trained to receive information associated with a high-resolution image and a bitrate as an input value to output a low-resolution image, by inputting the first image
(Continued)

and the first information to the artificial intelligence model, and transmit the second image through the call connection.

18 Claims, 25 Drawing Sheets

(58) Field of Classification Search
CPC ........ H04N 5/926; H04N 7/14; H04N 21/414; H04N 21/462
See application file for complete search history.

(56) References Cited

U.S. PATENT DOCUMENTS

| | | | | |
|---|---|---|---|---|
| 2019/0333198 | A1* | 10/2019 | Wang | G06T 5/50 |
| 2020/0184685 | A1 | 6/2020 | Kim et al. | |
| 2020/0226718 | A1* | 7/2020 | Reddy | G06T 3/4046 |
| 2021/0166343 | A1 | 6/2021 | Kim et al. | |
| 2021/0166344 | A1 | 6/2021 | Na et al. | |
| 2021/0264567 | A1 | 8/2021 | Kim et al. | |
| 2022/0006843 | A1 | 1/2022 | Do et al. | |

FOREIGN PATENT DOCUMENTS

| | | | | | |
|---|---|---|---|---|---|
| KR | 10-1885855 | B1 | | 8/2018 | |
| KR | 10-2021-0067783 | A | | 6/2021 | |
| KR | 10-2021-0067788 | A | | 6/2021 | |
| KR | 10-2287942 | B1 | | 8/2021 | |
| KR | 10-2021-0154061 | A | | 12/2021 | |
| KR | 10-2021-0154700 | A | | 12/2021 | |
| KR | 10-2022-0003812 | A | | 1/2022 | |
| KR | 10-2022-0027436 | A | | 3/2022 | |
| KR | 10-2022-0036061 | A | | 3/2022 | |
| KR | 20220036061 | A | * | 3/2022 | G06N 3/09 |
| KR | 10-2022-0081648 | A | | 6/2022 | |

* cited by examiner

ELECTRONIC DEVICE PERFORMING SCALING USING ARTIFICIAL INTELLIGENCE MODEL AND METHOD FOR OPERATING THE SAME

CROSS-REFERENCE TO RELATED APPLICATION(S)

This application is a continuation application, claiming priority under § 365(c), of an International application No. PCT/KR2023/019076, filed on Nov. 24, 2023, which is based on and claims the benefit of a Korean patent application number 10-2022-0158847, filed on Nov. 24, 2022, in the Korean Intellectual Property Office, and of a Korean patent application number 10-2022-0178075, filed on Dec. 19, 2022, in the Korean Intellectual Property Office, the disclosure of each of which is incorporated by reference herein in its entirety.

TECHNICAL FIELD

The disclosure relates to an electronic device that performs scaling using an artificial intelligence model (AI) model and a method for operating the same.

BACKGROUND ART

When transmitting multimedia content, the multimedia content (e.g., an image) may be encoded by a codec that complies with data compression standards. A bitstream generated as a result of the encoding may be transmitted through a communication channel. For example, when an electronic device establishes a connection for a video call, a bitstream may be transmitted through the connection for a call.

To downsize the bitstream, multimedia content, e.g., an image, may be down-scaled. The down-scaled image may have a relatively smaller data size than the original image. The down-scaled image may be encoded, and a bitstream generated as a result of the encoding may have a relatively smaller data size than the bitstream corresponding to the original image. The receiving electronic device may receive the bitstream and then decode it using a codec. The receiving electronic device may up-scale the decoding result. By the up-scaling, a higher-resolution image than the image generated as a result of decoding may be generated and/or provided. An AI model for down-scaling and/or up-scaling may be used for the down-scaling and/or up-scaling.

The above information is presented as background information only to assist with an understanding of the disclosure. No determination has been made, and no assertion is made, as to whether any of the above might be applicable as prior art with regard to the disclosure

DISCLOSURE OF INVENTION

Solution to Problems

Aspects of the disclosure are to address at least the above-mentioned problems and/or disadvantages and to provide at least the advantages described below. Accordingly, an aspect of the disclosure is to provide an electronic device that performs scaling using an AI model and a method for operating the same.

Additional aspects will be set forth in part in the description which follows and, in part, will be apparent from the description, or may be learned by practice of the presented embodiments.

In accordance with an aspect of the disclosure, an electronic device is provided. The electronic device includes memory, a camera module, a communication module, and at least one processor operatively connected to the memory, the camera module, and the communication module. The memory, when executed by the at least one processor, cause the electronic device to establish a call connection with a network based on the communication module, identify a first image captured based on the camera module, identify first information associated with a first bitrate corresponding to the first image, based on a communication environment between the network and the electronic device, identify a second image corresponding to the first image output from an artificial intelligence model for down-scaling, trained to receive information associated with a high-resolution image and a bitrate as an input value to output a low-resolution image, by inputting the first image and the first information to the artificial intelligence model, and transmit the second image through the call connection based on the communication module.

In accordance with another aspect of the disclosure, a method for operating an electronic device is provided. The method includes establishing a call connection with a network based on a communication module, identifying a first image captured based on a camera module of the electronic device, identifying first information associated with a first bit rate corresponding to the first image, based on a communication environment between the network and the electronic device, identifying a second image corresponding to the first image output from an artificial intelligence model for down-scaling, trained to receive information associated with a high-resolution image and a bitrate as an input value to output a low-resolution image, by inputting the first image and the first information to the artificial intelligence model, and transmitting the second image through the call connection based on a communication module of the electronic device.

According to an embodiment of the disclosure, one or more non-transitory computer-readable storage media storing at least one computer-readable instruction is provided. The at least one instruction, when executed by at least one processor of an electronic device, configures the electronic device to perform at least one operation including establishing a call connection with a network based on a communication module, identifying a first image captured based on a camera module of the electronic device, identifying first information associated with a first bit rate corresponding to the first image, based on a communication environment between the network and the electronic device, identifying a second image corresponding to the first image output from an artificial intelligence model for down-scaling, trained to receive information associated with a high-resolution image and a bitrate as an input value to output a low-resolution image, by inputting the first image and the first information to the artificial intelligence model, and transmitting the second image through the call connection based on the communication module.

In accordance with another aspect of the disclosure, an electronic device is provided. The electronic device includes memory, a display module, a communication module, and at least one processor operatively connected to the memory, the display module, and the communication module The memory, when executed by the at least one processor, cause the electronic device to establish a call connection with a network based on the communication module, receive the first image through the call connection based on the communication module, identify first information associated with a first bitrate corresponding to the first image, based on a communication environment between the network and the electronic device, identify a second image corresponding to the first image output from an artificial intelligence model for up-scaling, trained to receive information associated with a low-resolution image and a bitrate as an input value to output a high-resolution image, by inputting the first image and the first information to the artificial intelligence model, and control the display module to display at least a portion of the second image.

In accordance with another aspect of the disclosure, a method for operating an electronic device is provided. The method includes establishing a call connection with a network based on a communication module, receiving a first image through the call connection based on the communication module of the electronic device, identifying first information associated with a first bit rate corresponding to the first image, based on a communication environment between the network and the electronic device, identifying a second image corresponding to the first image output from an artificial intelligence model for up-scaling, trained to receive information associated with a low-resolution image and a bitrate as an input value to output a high-resolution image, by inputting the first image and the first information to the artificial intelligence model, and controlling a display module of the electronic device to display at least a portion of the second image.

According to an embodiment of the disclosure, one or more non-transitory computer-readable storage media storing at least one computer-readable instruction is provided. The at least one instruction, when executed by at least one processor of an electronic device, configures the electronic device to perform at least one operation including receiving a first image through a call connection with a network based on a communication module of the electronic device, identifying first information associated with a first bit rate corresponding to the first image, based on a communication environment between the network and the electronic device, identifying a second image corresponding to the first image output from an artificial intelligence model for up-scaling, trained to receive information associated with a low-resolution image and a bitrate as an input value to output a high-resolution image, by inputting the first image and the first information to the artificial intelligence model, and controlling a display module of the electronic device to display at least a portion of the second image.

In accordance with another aspect of the disclosure, an electronic device for training a first AI model for down-scaling and a second AI model for up-scaling is provided. The electronic device includes memory and at least one processor. The memory, when executed by the at least one processor, cause the electronic device to identify training data including a first image, which is a high-resolution image, and first information associated with a bitrate, identify a second image, which is a low-resolution image, output from the first AI model, based on inputting the first image and the first information to the first AI model, identify a third image, which is a high-resolution image, output from the second AI model, based on inputting the second image and the first information to the second AI model, identify a fourth image by down-scaling the first image, identify a total loss based on a first loss corresponding to the first image and the third image and a second loss corresponding to the second image and the fourth image, and train at least a portion of the first AI model and the second AI model based on the total loss.

In accordance with another aspect of the disclosure, a method for training a first AI model for down-scaling and a second AI model for up-scaling is provided. The method includes identifying training data including a first image which is a high-resolution image and first information associated with a bitrate, identifying a second image, which is a low-resolution image, output from the first AI model, based on inputting the first image and the first information to the first AI model, identifying a third image, which is a high-resolution image, output from the second AI model, based on inputting the second image and the first information to the second AI model, identifying a fourth image by down-scaling the first image, identifying a total loss based on a first loss corresponding to the first image and the third image and a second loss corresponding to the second image and the fourth image, and training at least a portion of the first AI model and the second AI model based on the total loss.

According to an embodiment of the disclosure, one or more non-transitory computer-readable storage media storing at least one computer-readable instruction is provided. The at least one instruction, when executed by at least one processor of an electronic device, configures the electronic device to perform at least one operation including identifying training data including a first image, which is a high-resolution image, and first information associated with a bitrate, identifying a second image, which is a low-resolution image, output from the first AI model, based on inputting the first image and the first information to the first AI model for down-scaling, identifying a third image, which is a high-resolution image, output from the second AI model, based on inputting the second image and the first information to the second AI model for up-scaling, identifying a fourth image by down-scaling the first image identifying a total loss based on a first loss corresponding to the first image and the third image and a second loss corresponding to the second image and the fourth image, and training at least a portion of the first AI model and the second AI model based on the total loss.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
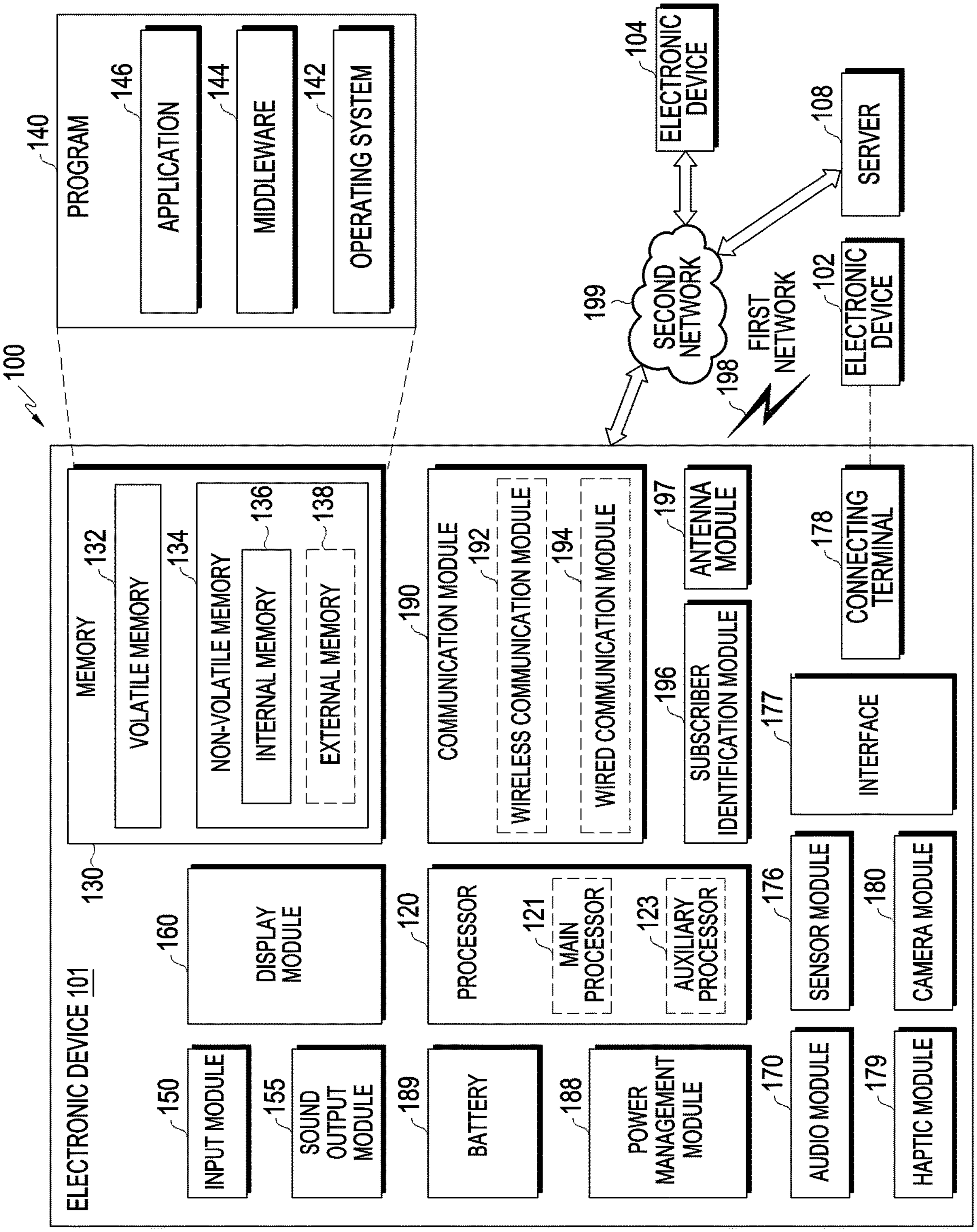
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or an external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, memory 130, an input module 150, a sound output module 155, a display module 160, an audio module 170, a sensor module 176, an interface 177, a connecting terminal According to an embodiment of the disclosure, the display module 160 may include a first display module 351 corresponding to the user's left eye and/or a second display module 353 corresponding to the user's right eye, a haptic module 179, a camera module 180, a power management module 188, a battery 189, a communication module 190, a subscriber identification module (SIM) 196, or an antenna module 197. In an embodiment of the disclosure, at least one (e.g., the connecting terminal 178) of the components may be omitted from the electronic device 101, or one or more other components may be added in the electronic device 101. According to an embodiment of the disclosure, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment of the disclosure, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., a sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for AI model processing. The AI model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The AI model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The AI model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor configured to detect a touch, or a pressure sensor configured to measure the intensity of a force generated by the touch.

The audio module 170 may convert a sound into an electrical signal and vice versa. According to an embodiment of the disclosure, the audio module 170 may obtain the sound via the input module 150, or output the sound via the sound output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment of the disclosure, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to an embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (wi-fi) direct, or infrared data association (IrDA)) or a second network 199 (e.g., a long-range communication network, such as a legacy cellular network, a fifth generation (5G) network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment of the disclosure, the wireless communication module 192 may support a peak data rate (e.g., 20 gigabits per second (Gbps) or more) for implementing eMBB, loss coverage (e.g., 164 decibels (dB) or less) for implementing mMTC, or U-plane latency (e.g., 0.5 milliseconds (ms) or less for each of downlink (DL) and uplink (UL), or a round trip of 1 ms or less) for implementing URLLC.

The antenna module 197 may transmit or receive a signal or power to or from the outside (e.g., the external electronic device). According to an embodiment of the disclosure, the antenna module 197 may include one antenna including a radiator formed of a conductive body or conductive pattern formed on a substrate (e.g., a printed circuit board (PCB)). According to an embodiment of the disclosure, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment of the disclosure, other parts (e.g., radio frequency integrated circuit (RFIC)) than the radiator may be further formed as part of the antenna module 197.

According to an embodiment of the disclosure, the antenna module 197 may form a mmWave antenna module. According to an embodiment of the disclosure, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an Internet-of-things (IOT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., a smart home, a smart city, a smart car, or health-care) based on 5G communication technology or IoT-related technology.

Figure 2:
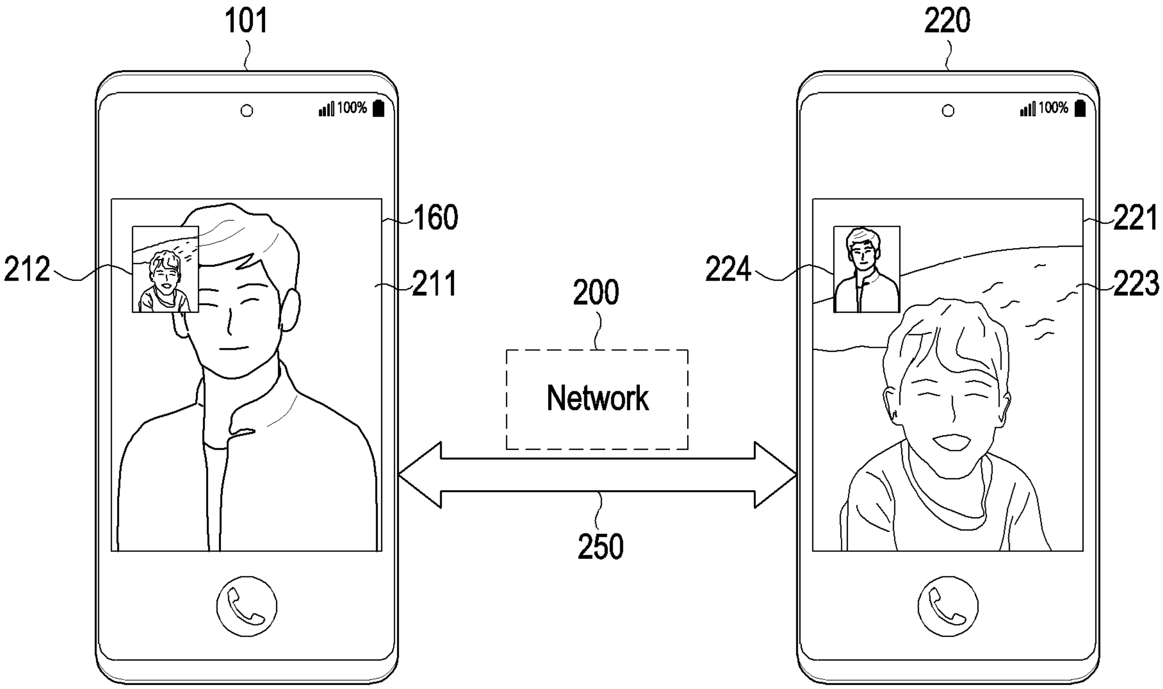
FIG. 2 is a view illustrating operations of an electronic device according to an embodiment of the disclosure.

FIG. 2 is a view illustrating operations of an electronic device according to an embodiment of the disclosure.

Referring to FIG. 2, according to an embodiment of the disclosure, the electronic device 101 (e.g., the processor 120) may establish a connection 250 (or may be referred to as a session or a channel) for a video call, based on the communication module 190. For example, the electronic device 101 may perform at least one procedure for establishing the connection 250 for a call according to the Internet protocol (IMS) multimedia subsystem (IMS) standard through a network 200 but is not limited thereto. The electronic device 101 may be a mobile origination (MO) device or a mobile termination (MT) device, and is not limited thereto.

According to an embodiment of the disclosure, the electronic device 101 may identify an image 212 captured based on the camera module 180. For example, the electronic device 101 may control the display module 160 to display the captured image (or down-scaled image) 212, but is not limited thereto. As is described below, the electronic device 101 may down-scale the captured image 212 and may generate a bitstream by encoding the down-scaled image. The electronic device 101 may transmit the generated bitstream to the external electronic device 220 through the connection 250. The external electronic device 220 may receive the bitstream. As is described below, the external electronic device 220 may decode the received bitstream and up-scale the decoded image. The external electronic device 220 may control a display module 221 to display an up-scaled image 223. Meanwhile, the external electronic device 220 may also control the display module 221 to display an image 224 captured by the camera module (not shown). The external electronic device 220 may generate a bitstream by encoding the down-scaled image of the captured image 224. The external electronic device 220 may transmit the generated bitstream to the electronic device 101 through the connection 250. The electronic device 101 may decode the received bitstream. The electronic device 101 may perform up-scaling on the decoded image and may control the display module 160 to display an image 211 based on the up-scaling result. Accordingly, the display module 160 may display the image 212 captured by the camera module 180 of the electronic device 101 and the image 211 transmitted from the external electronic device 220. The external electronic device 220 may display the captured image 224 and the image 223 transmitted from the electronic device 101.

According to an embodiment of the disclosure, the electronic device 101 may down-scale the captured image using an AI model for down-scaling. For example, the AI model may be trained to receive a high-resolution image and information associated with a bitrate as input values and output a low-resolution image (or referred to as a down-scaled image). According to an embodiment of the disclosure, the electronic device 101 may up-scale the received and decoded image using the AI model for up-scaling. For example, the AI model may be trained to receive a low-resolution image and information associated with a bitrate as input values and output a high-resolution image (or an up-scaled image). The structure and/or training of the AI model for down-scaling and/or the AI model for up-scaling is described below.

Figure 3A:
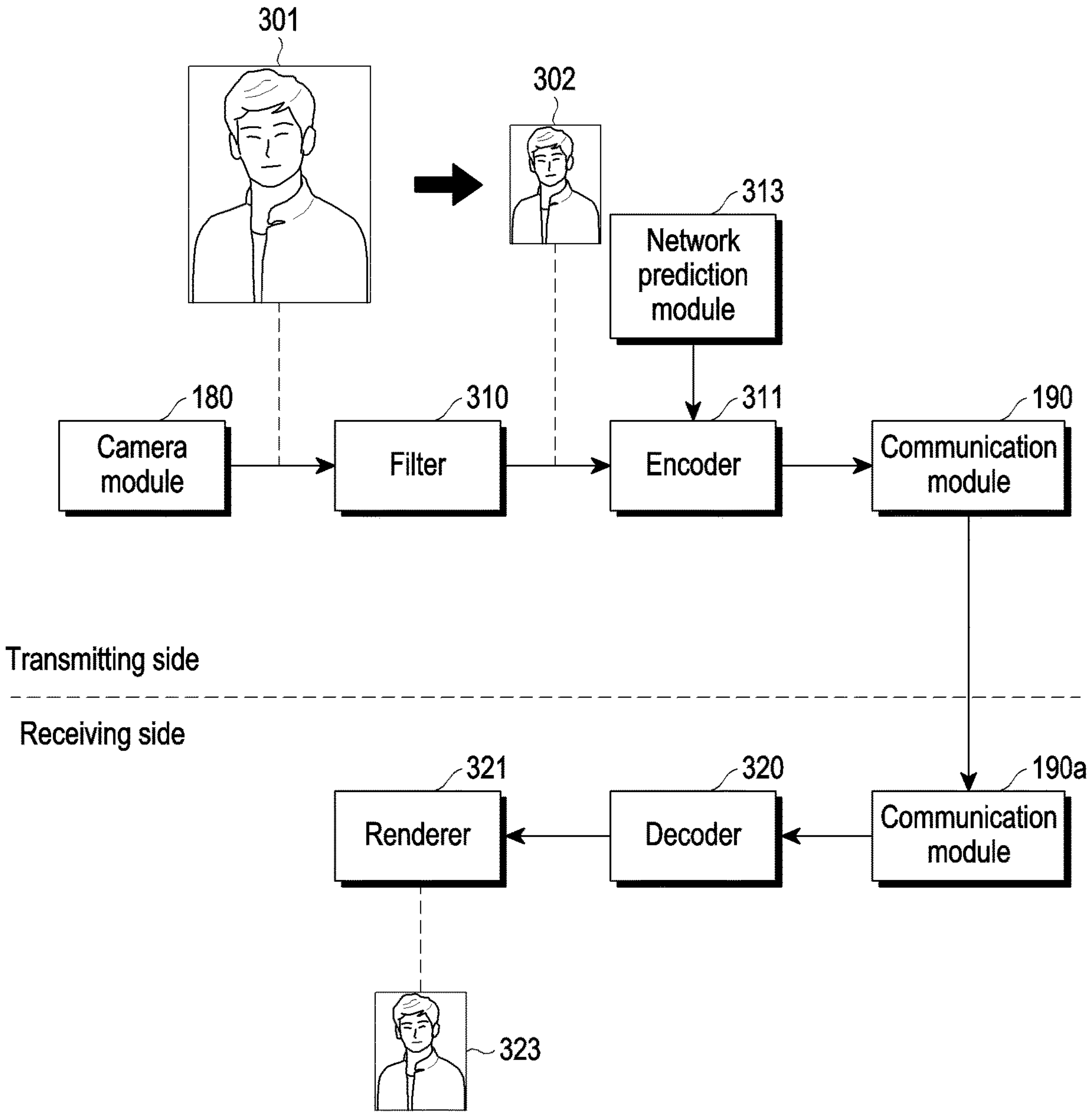
FIG. 3A is a view illustrating a comparative example according to an embodiment of the disclosure.

FIG. 3A is a view illustrating a comparative example according to an embodiment of the disclosure.

Referring to FIG. 3A, at least some of the operations according to the comparative example based on FIG. 3A and/or another comparative example of the disclosure may be performed by the electronic device 101 according to an embodiment of the disclosure.

According to a comparative example, the electronic device 101 may identify a high-resolution image 301 captured by the camera module 180. The high-resolution image 301 may have, e.g., a video graphic array (VGA)-class resolution or a high definition (HD)-class resolution, but this is exemplary and the resolution of the high-resolution image 301 is not limited thereto. A filter 310 operated by the electronic device 101 may down-scale the high-resolution image 301 to output a low-resolution image 302. The filter 310, as, e.g., a normal filter, may perform down-scaling based on a Bicubic method or a lanczos method, but the down-scaling method is not limited thereto. The low-resolution image 302 may have, e.g., a quarter VGA (QVGA)-class resolution or an nHD-class resolution, but this is illustrative and the resolution of the low-resolution image 302 is not limited thereto.

An encoder 311 operated by the electronic device 101 may generate a bitstream by encoding the low-resolution image 302. The encoder 311 may perform encoding using a codec (e.g., moving picture experts group 2 (MPEG-2), H.264, MPEG-4, high efficiency video coding (HEVC), VC-1, VP8, VP9, or AV1), but the type of the codec is not limited. The bitstream may be packetized by, e.g., a real-time transport protocol (RTP), and transmitted. A network prediction module 313 operated by the electronic device 101 may predict a communication environment between the electronic device 101 and the network 200. The network prediction module 313 may predict the communication environment between the electronic device 101 and the network 200 based on a network parameter (e.g., one-way delay, perceived bitrate, and/or packet loss rate). The prediction of the communication environment between the electronic device 101 and the network 200 by the network prediction module 313 is described below. The bitrate for encoding may be set based on a communication environment prediction result between the electronic device 101 and the network 200. For example, when it is predicted that the communication environment between the electronic device 101 and the network 200 is relatively good, the bitrate may be set to be relatively high, but this is merely an example and is not limited thereto. When the bitrate is determined, the remaining codec parameters (e.g., resolution and/or framerate (or frames per second (FPS)) for encoding may be determined. For example, when the bitrate is determined based on the communication environment between the electronic device 101 and the network 200, the resolution and/or the framerate may be determined based on the determined bitrate and the compression rate of the codec. The bitstream generated as a result of the encoding of the encoder 311 may be provided to the communication module **190*a* of the receiving electronic device through the communication module 190. The received bitstream may be decoded by a decoder 320 operated by the receiving electronic device (which may be the same as the electronic device 101). A decoded image 323 may be rendered by a renderer 321 operated by the receiving electronic device, and accordingly, at least a portion of the decoded image 323 may be displayed on the receiving electronic device. Meanwhile, according to the comparative example of FIG. 3A, the decoded image 323 may have the same resolution as the down-scaled low-resolution image 302**. Accordingly, an image having a relatively small resolution may be displayed on the receiving electronic device.

Figure 3B:
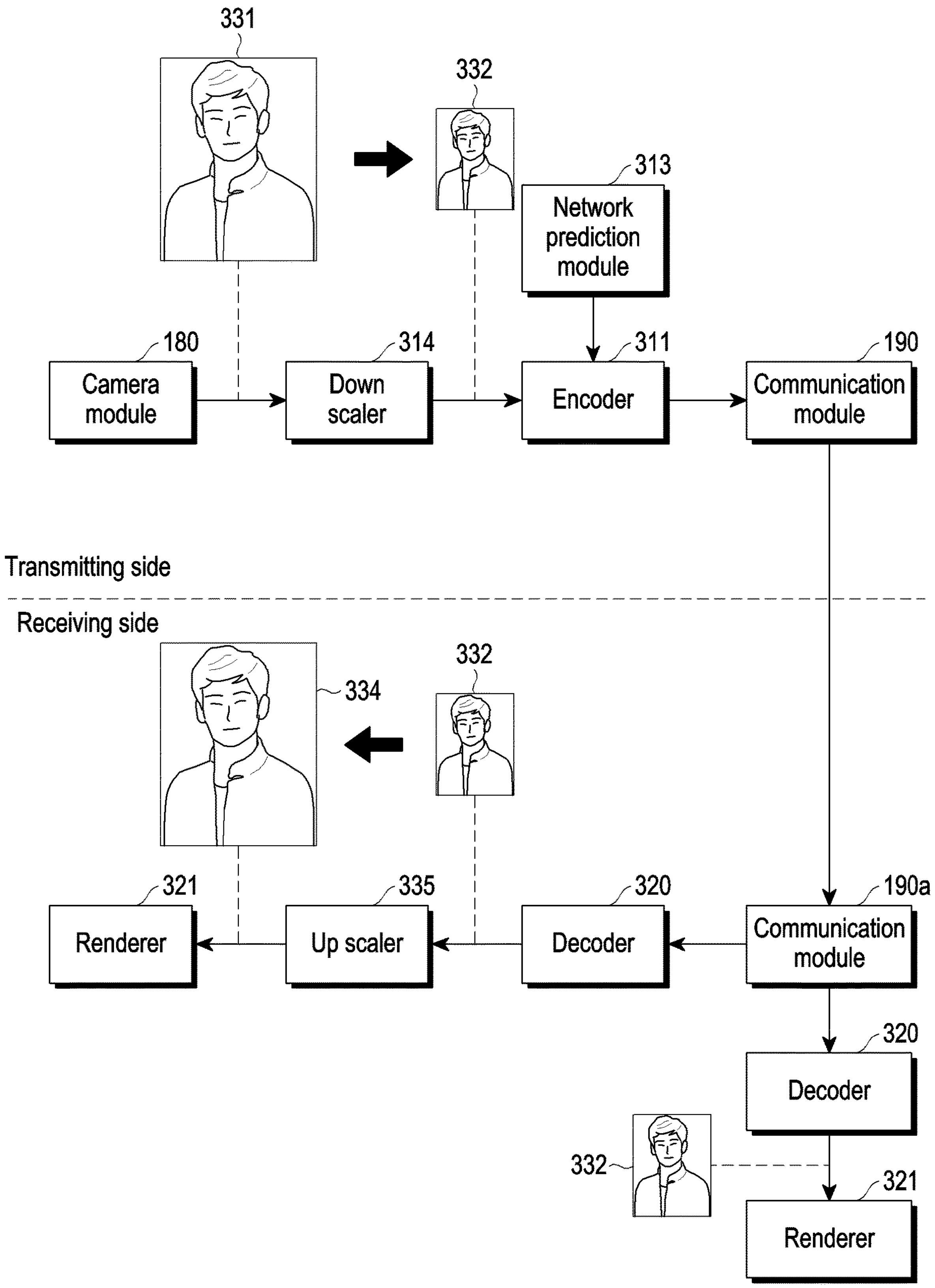
FIG. 3B is a view illustrating a comparative example according to an embodiment of the disclosure.

FIG. 3B is a view illustrating a comparative example according to an embodiment of the disclosure.

Referring to FIG. 3B, at least some of the operations according to the comparative example may be performed by the electronic device 101 according to an embodiment of the disclosure.

According to a comparative example, the electronic device 101 may identify a high-resolution image 301 captured by the camera module 180. A high-resolution image 331 may have, e.g., a VGA-class resolution or an HD-class resolution, but this is illustrative and the resolution of the high-resolution image 331 is not limited thereto. A down scaler 314 operated by the electronic device 101 may down-scale the high-resolution image 331 to output a low-resolution image 332. The down scaler 314 may be implemented as, e.g., an AI model, but is not limited as long as down-scaling may be performed. When implemented as an AI model, the down scaler 314 may be referred to as an AI scaler. The low-resolution image 332 may have, e.g., a QVGA)-class resolution or an nHD-class resolution, but this is illustrative and the resolution of the low-resolution image 332 is not limited thereto. The encoder 311 operated by the electronic device 101 may generate a bitstream by encoding the low-resolution image 332. A network prediction module 313 operated by the electronic device 101 may predict a communication environment between the electronic device 101 and the network 200. The bitrate for encoding may be set based on a communication environment prediction result between the electronic device 101 and the network 200. For example, when the bitrate is determined based on the communication environment between the electronic device 101 and the network 200, the resolution and/or the framerate may be determined based on the determined bitrate and the compression rate of the codec. The bitstream generated as a result of the encoding of the encoder 311 may be provided to the communication module 190*a* of the receiving electronic device through the communication module 190. The received bitstream may be decoded by the decoder 320 operated by the receiving electronic device (which may be the same as the electronic device 101).

An up scaler 335 may up-scale the decoded image 332 to provide a high-resolution image 334. The up scaler 335 may be implemented as, e.g., an AI model, but is not limited as long as up-scaling may be performed. When implemented as an AI model, the up scaler 335 may be referred to as an AI scaler. The high-resolution image 334 may have substantially the same resolution as the high-resolution image 331 captured by, e.g., the transmitting electronic device 101. The high-resolution image 334 may be rendered by a renderer 321 operated by the receiving electronic device, and accordingly, at least a portion of the high-resolution image 334 may be displayed on the receiving electronic device. Meanwhile, in another example, as illustrated in FIG. 3A, the receiving electronic device 101 may render the decoded low-resolution image 332 without the up-scaling process.

As described above, a high-resolution image having substantially the same resolution as the image captured by the transmitting electronic device 101 may be provided by the receiving electronic device. Further, since the codec parameters (e.g., bitrate, resolution, and/or framerate) of the encoder 311 may be set based on the communication environment between the electronic device 101 and the network 200, if the communication environment between the electronic device 101 and the network 200 is poor, a low-quality bitstream may be transmitted, thereby preventing delay or loss. However, in the example of FIG. 3B, the communication environment between the electronic device 101 and the network 200 is not considered during down-scaling and/or up-scaling. Because the quality (e.g., whether it is blocky) on the receiving side is affected by the encoded bitrate transmitted, it may be required to introduce an AI scaler that considers the bitrate in real time (or semi-real time). In embodiments of the disclosure, e.g., an AI model in which information associated with a bitrate set based on the communication environment between the electronic device 101 and the network 200 is considered may be used for down-scaling and/or up-scaling, and/or may be trained.

Figure 4:
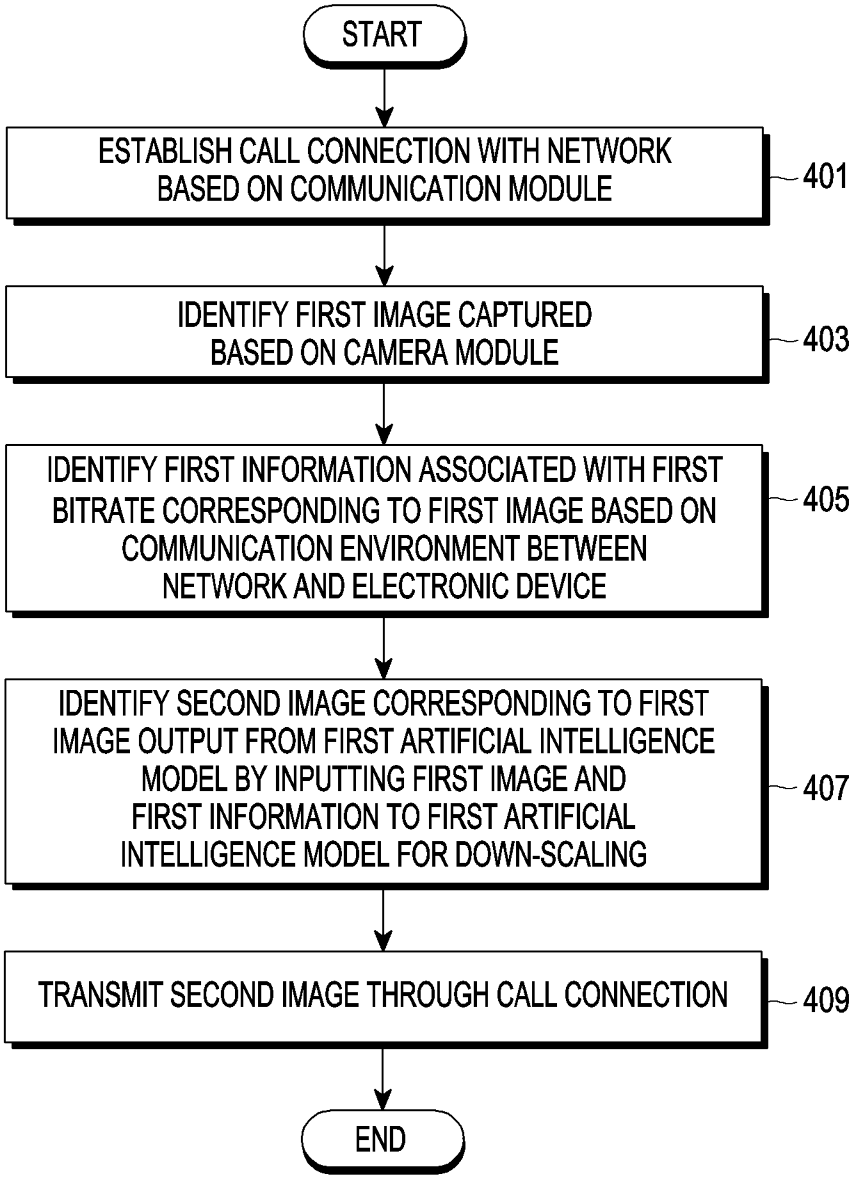
FIG. 4 is a flowchart illustrating operations of an electronic device according to an embodiment of the disclosure.

FIG. 4 is a flowchart illustrating operations of an electronic device according to an embodiment of the disclosure. The embodiment of FIG. 4 is described with reference to FIG. 5.

Figure 5:
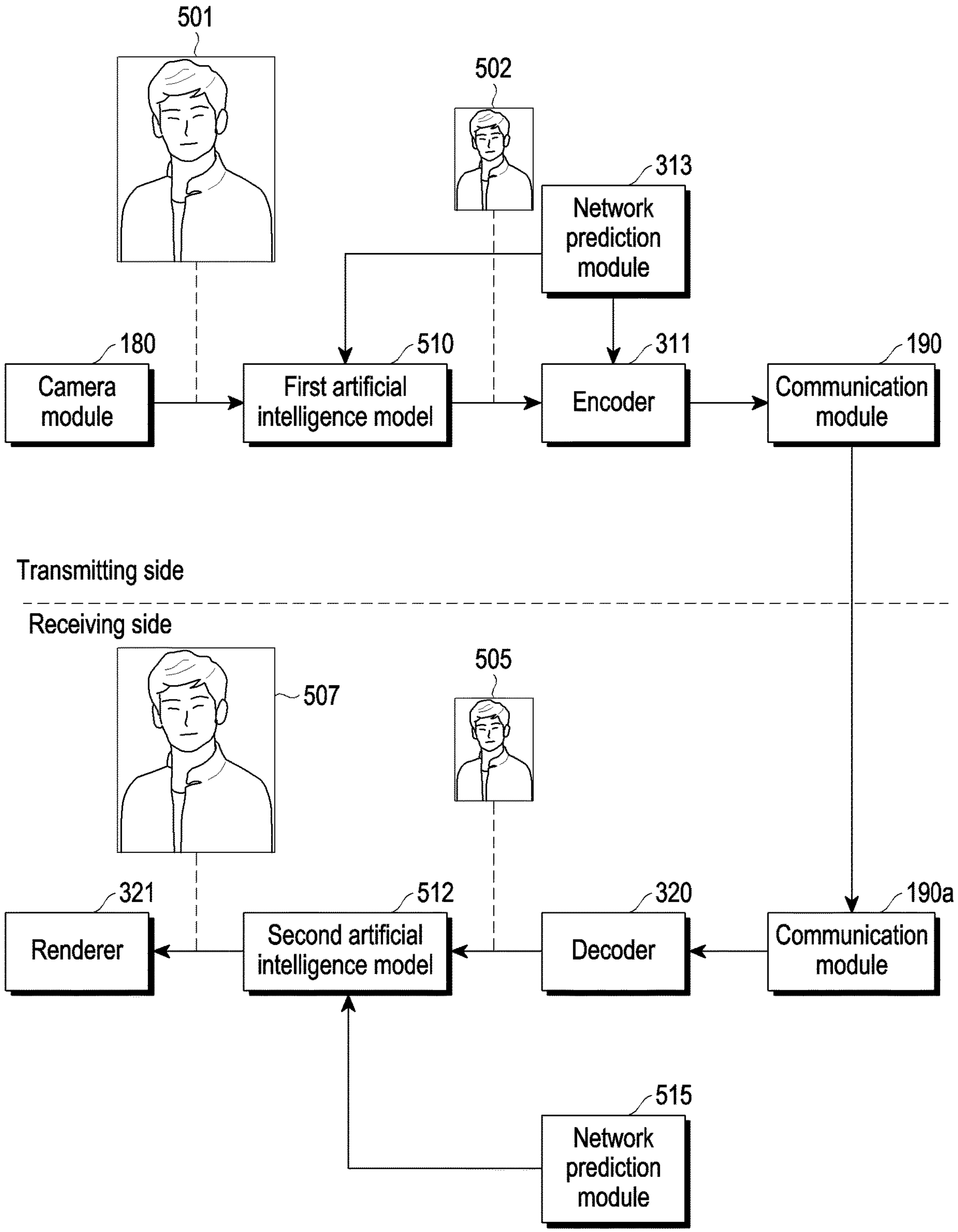
FIG. 5 is a view illustrating a transmitting electronic device and a receiving electronic device according to an embodiment of the disclosure.

FIG. 5 is a view illustrating a transmitting electronic device and a receiving electronic device according to an embodiment of the disclosure.

Referring to FIGS. 4 and 5 together, according to an embodiment of the disclosure, the electronic device 101 (e.g., the processor 120) may establish a call connection with a network, based on the communication module 190, in operation 401. As described above, e.g., the electronic device 101 may perform a procedure according to the IMS standard, but this is exemplary, and the procedure for establishing a call connection is not limited. In operation 403, the electronic device 101 may identify a first image 501 captured based on the camera module 180. The first image 501 is, e.g., a high-resolution image may have a VGA-class resolution or an HD-class resolution, but this is illustrative and the resolution of the high-resolution image is not limited thereto. In operation 405, the electronic device 101 may identify the first information associated with the first bitrate corresponding to the first image 501, based on the communication environment between the network and the electronic device 101. In one example, bit per pixel (BPP), which is information associated with the bitrate, may be expressed as Equation 1.

$$BPP=bitrate/(resolution\times framerate) \quad \text{Equation 1}$$

The bitrate in Equation 1 may be determined based on, e.g., the communication environment. For example, a relatively high bitrate may be determined when the communication environment is relatively good, and a relatively low bitrate may be determined when the communication environment is relatively poor, but the disclosure is not limited thereto. For example, the communication environment may be categorized into a plurality of ranges, and bitrates may be mapped and managed for each category, but this is exemplary, and there is no limitation on a method for determining an indicator (or format) indicating the communication environment and/or a bitrate corresponding to the indicator. Embodiments related to the communication environment are described below. When the bitrate is determined, resolution and/or framerate, which are the remaining codec parameters, may be determined. For example, the resolution and/or framerate corresponding to the bitrate may be determined based on the codec compression rate, but this is exemplary and the determination method is not limited thereto. In one example, the communication environment may be determined by the network prediction module 313. The bit rate corresponding to the communication environment may be determined by at least one of the network prediction module 313 or the encoder 311. The remaining codec parameters (e.g., resolution and/or framerate) corresponding to the bitrate may be determined by at least one of the network prediction module 313 or the encoder 311. The bitrate-related information (e.g., BPP as shown in Equation 1) may be determined by at least one of the network prediction module 313 or the encoder 311. Meanwhile, the operation of the network prediction module 313 and/or the encoder 311 may be performed by, e.g., the processor 120, but is not limited thereto.

According to an embodiment of the disclosure, in operation 407, the electronic device 101 may identify a second image 502 corresponding to the first image 501 output from a first AI model 510 by inputting the first image 501 and the first information (e.g., BPP) to the first AI model 510 for down-scaling. In contrast to the down scaler 314 in the comparative example of FIG. 3B configured to receive only the high-resolution image 331 as an input value and provide a corresponding low-resolution image 332, the first AI model 510 of FIGS. 4 and 5 may be configured to receive not only the first image 501 but also information (e.g., BPP) related to the bitrate as an input value and provide the second image 502 having a low-resolution. The first AI model 510 may include, e.g., a neural network for extracting an image feature corresponding to the first image 501 and a neural network for extracting a meta information feature corresponding to information (e.g., a BPP) associated with the bitrate, and may have a structure for performing a multiplication operation between the image feature and the meta information feature, but is not limited thereto, and a description thereof and training of the first AI model 510 are described below. In operation 409, the electronic device 101 may transmit the second image 502 through a call connection, based on the communication module 190. Here, the transmission of the second image 502 may include, e.g., generation of a bitstream based on encoding of the second image 502 and transmission of the bitstream. As shown in FIG. 5, the encoder 311 may encode the second image 502 to generate a bitstream. As described above, the encoder 311 may generate a bitstream by performing encoding based on the bitrate determined based on the communication environment and the resolution and/or framerate set based on the bitrate. As described above, at least some of codec parameters including the bitrate, the resolution, and/or the framerate may be used not only by the encoder 311, but also as at least some of the input values of the first AI model 510 for down-scaling. The bitstream may be provided to the receiving electronic device (which may be the same device as the electronic device 101) through the communication module 190. If a plurality of AI models are configured for various bit rates, respectively, to reflect a change in the communication environment in real time, and any one of the plurality of AI models is selected to perform down-scaling, the size of information (e.g., a library) to be stored in the electronic device 101 may increase sharply. In contrast, the electronic device 101 according to an embodiment of the disclosure may perform down-scaling using an AI model trained to receive information associated with the bitrate and the high-resolution image as input values and output the low-resolution image corresponding to the high-resolution image, so that the amount of information of the AI model may be relatively small as compared to when the plurality of AI models are configured for various bitrates, respectively. Meanwhile, the operation of the receiving electronic device of FIG. 5 is described with reference to FIG. 6. As described above, even when the call channel is in a relatively poor state, high-quality content may be provided to the receiving device without deterioration of content quality (low-resolution/locky/delay).

Figure 6:
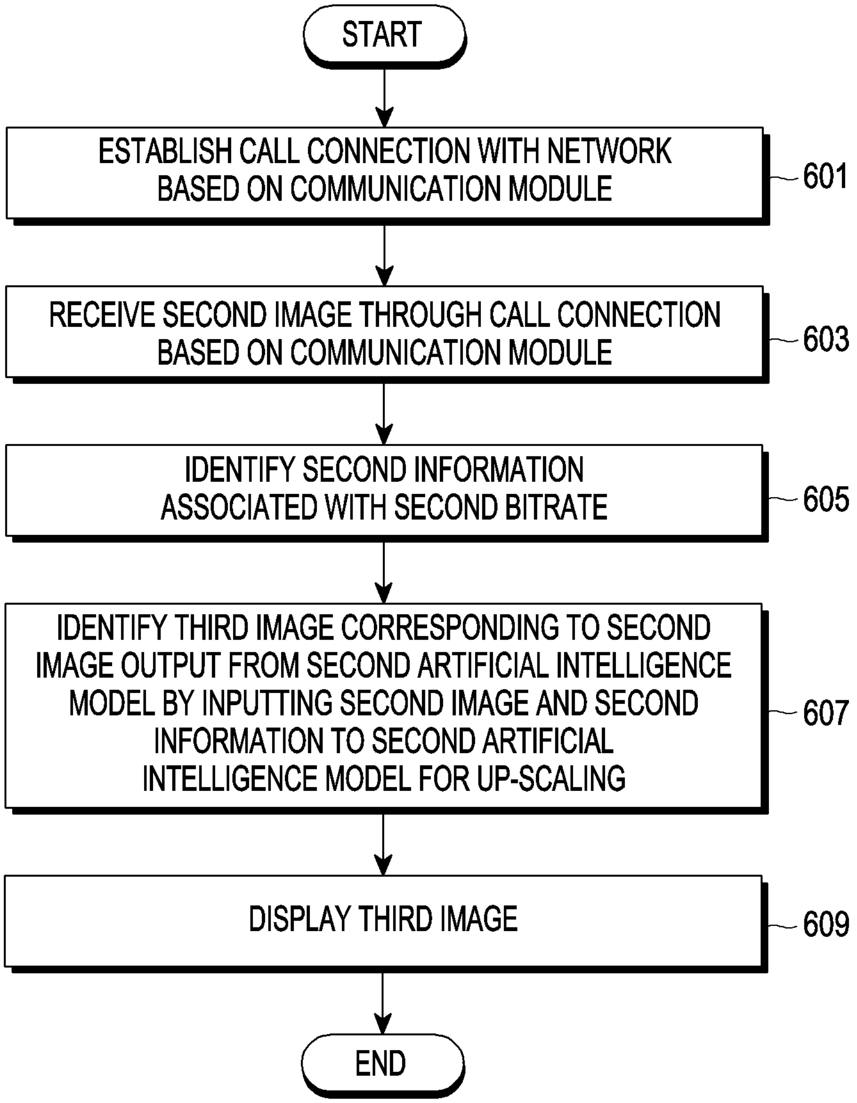
FIG. 6 is a flowchart illustrating operations of an electronic device according to an embodiment of the disclosure.

FIG. 6 is a flowchart illustrating operations of an electronic device according to an embodiment of the disclosure. The embodiment of FIG. 6 is described with reference to FIG. 5.

Referring to FIGS. 5 and 6 together, according to an embodiment of the disclosure, the electronic device 101 (e.g., the processor 120) may establish a call connection with a network, based on the communication module 190, in operation 601. Meanwhile, FIG. 5 illustrates that the receiving electronic device includes a communication module 190*a*. However, the electronic device 101 according to an embodiment may perform the operation of the receiving electronic device of FIG. 5. The electronic device 101 may establish a call connection, e.g., based on performing a procedure according to the IMS standard, but the method of establishment is not limited. In operation 603, the electronic device 101 may receive the second image 505 through a call connection, based on the communication module 190. Here, the reception of the second image 505 may include, e.g., reception of a bitstream generated as the second image is encoded and decoding of the bitstream by the decoder 320. Operations performed by the decoder 320, a network prediction module 515, and/or the renderer 321 may be performed by the processor 120 of the electronic device 101, but are not limited thereto. In operation 605, the electronic device 101 may identify second information associated with the second bitrate. For example, the second bitrate estimated by the network prediction module 515 and/or the decoder 320 and the second information (e.g., BPP) corresponding to the second bitrate may be identified. The identification of the second information is described below.

According to an embodiment of the disclosure, in operation 607, the electronic device 101 may identify the third image 507 corresponding to the second image 505 output from a second AI model 512 by inputting the second image 505 and the second information (e.g., BPP) to the second AI model 512 for up-scaling. In operation 609, the electronic device 101 may display the third image 507 (or at least a portion thereof). The second AI model 512 may include, e.g., a neural network for extracting an image feature corresponding to the second image 505 and a neural network for extracting a meta information feature corresponding to information (e.g., a BPP) associated with the bitrate, and may have a structure for performing a multiplication operation between the image feature and the meta information feature, but is not limited thereto, and a description thereof and training of the second AI model 512 are described below. If a plurality of AI models are configured for various bit rates, respectively, to reflect a change in the communication environment in real time, and any one of the plurality of AI models is selected to perform up-scaling, the size of information (e.g., a library) to be stored in the electronic device 101 may increase sharply. In contrast, the electronic device 101 according to an embodiment of the disclosure may perform up-scaling using an AI model trained to receive information associated with the bitrate and the low-resolution image as input values and output the high-resolution image corresponding to the low-resolution image, so that the amount of information of the AI model may be relatively small as compared to when the plurality of AI models are configured for various bitrates, respectively.

Figure 7:
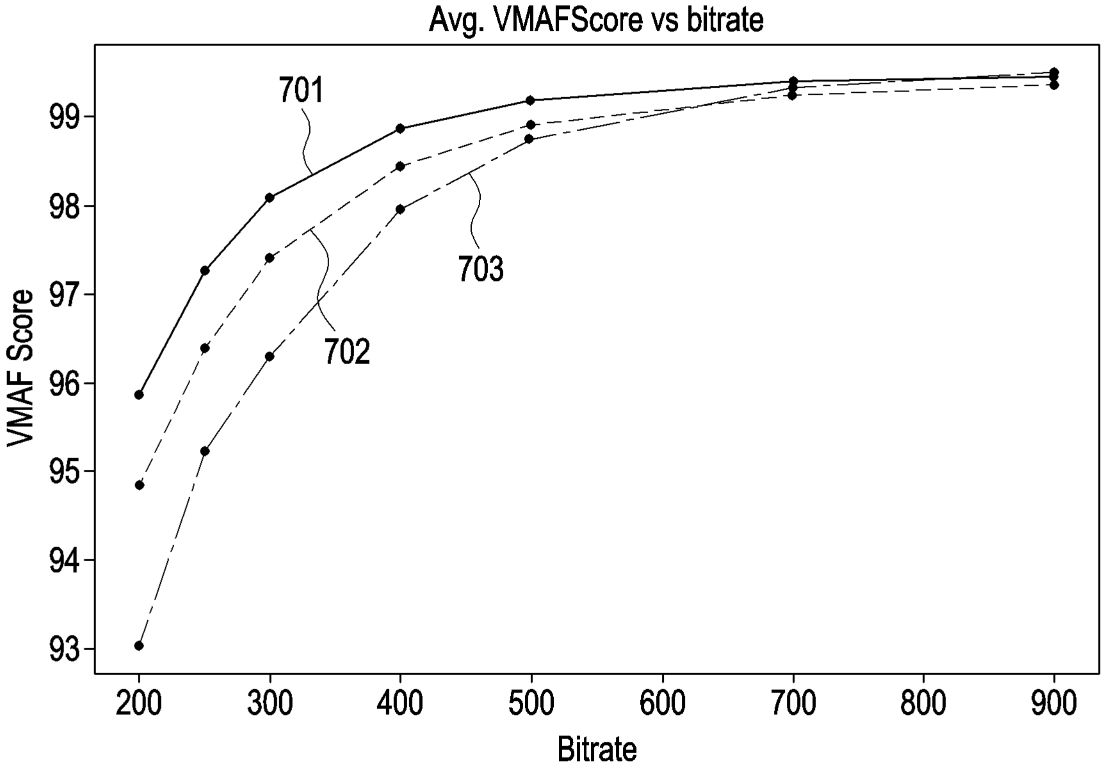
FIG. 7 illustrates video multimethod assessment fusion (VMAF) scores according to a comparative example according to an embodiment of the disclosure.

FIG. 7 illustrates VMAF scores according to a comparative example according to an embodiment of the disclosure.

Referring to FIG. 7, it illustrates a video multimethod assessment fusion (VMAF) score 701 for the bitrate when an AI model for down-scaling to receive the information (e.g., BPP) associated with the bitrate and the high-resolution image as input values and output the low-resolution image and an AI model for up-scaling to receive the information (e.g., BPP) associated with the bitrate and the low-resolution image as input values and output the high-resolution image are used according to an embodiment. VMAF may be, e.g., an objective overall reference video quality metric developed by the University of Southern California, the IPI/LS2N Research Institute of the University of Nantes, the Image and Video Engineering Research Institute of the University of Nantes, and Netflix, which is exemplary and is not limited to the evaluation score indicating image quality. A VMAF score 702 for the bitrate when an AI model for down-scaling to receive the high-resolution image as an input value and output the low-resolution image and an AI model for up-scaling to receive the low-resolution image as an input value and output the high-resolution image are used is illustrated. A VMAF score 703 for a case where an AI model according to the comparative example is not used is illustrated. It may be identified that the VMAF score 701 according to the embodiment is higher than the VMAF scores 702 and 703 for other cases.

Figure 8A:
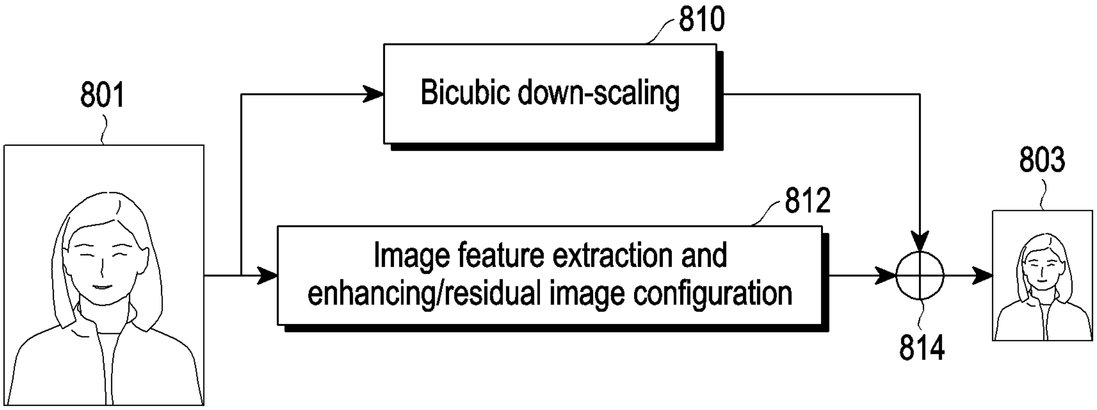
FIG. 8A is a view illustrating an artificial intelligence (AI) model for down-scaling according to an embodiment of the disclosure.

FIG. 8A is a view illustrating an AI model for down-scaling according to an embodiment of the disclosure.

Referring to FIG. 8A, according to a comparative example, the electronic device 101 may identify a first image 801 (or an image included in the training data set) captured by the camera module 180. The electronic device 101 may down-scale the first image 801 to a second image 803 using an AI model for down-scaling. Meanwhile, in FIG. 8A, a process of applying an AI model has been described, but the embodiment of FIG. 8A may be performed during a training process, which is described with reference to FIGS. 8C and 8D. In the comparative example of FIG. 8A, the AI model may have, e.g., the structure of ResNet. Accordingly, the mobile electronic device 101 for a video call may use the AI model with a relatively small amount of computation, but this is merely an example, and it will be understood by one of ordinary skill in the art that the AI model is not limited as long as it is structured for down-scaling. Meanwhile, ResNet may be trained to enhance overall resolution by enhancing the residual line rather than image scaling, but is not limited thereto. For example, the Raw YUV 420 method may be used, and training may be performed such that while UV based on legacy scaling is generated, the Y (luma) channel is enhanced, but the disclosure is not limited thereto. The AI model according to the comparative example may include, but is not limited to, a portion 810 for Bicubic down-scaling, a portion 812 for image feature extraction and enhancement/residual image configuration, and an image adder for Bilinear up-scaling 814. The portion 810 (or AI model) for Bicubic down-scaling may perform down-scaling based on, e.g., the Bicubic method, but the down-scaling method is not limited thereto. Based on the Bicubic method, e.g., the second image 803 having a resolution ¼ times that of the first image 801 may be generated, but is not limited thereto. The portion 810 for down-scaling may be a portion in ResNet except for a portion corresponding to Residual. The portion 812 for image feature extraction and enhancing/residual image configuration is a portion corresponding to the residual in ResNet, and may include, e.g., a convolution layer, but is not limited thereto, and may include a plurality of sub-AI structures. The image adder for Bilinear up-scaling 814 may be an adder capable of adding the original image (the down-scaled original image in this comparative example) defined in ResNet and the image corresponding to residual. Meanwhile, in the comparative example, a CLIP function as in Equation 2 may be used for the output image (e.g., the second image 803).

Output CLIP(MIN pixel,MAX pixel,Downscale+Residual) Equation 2

Output in Equation 2 may be the image (e.g., the second image 803 in FIG. 8A) output from ResNet. By the CLIP function, "downscale+Residual", e.g., the summation of the result of the portion 810 and the result of the portion 812 may be adjusted between the minimum pixels (MIN pixel) and maximum pixels (MAX pixel). As described above, according to the comparative example, a second image 803 that is a down-scaled image based on ResNet may be provided. However, as described above, the AI model according to the comparative example does not use the information related to the bitrate.

Figure 8B:
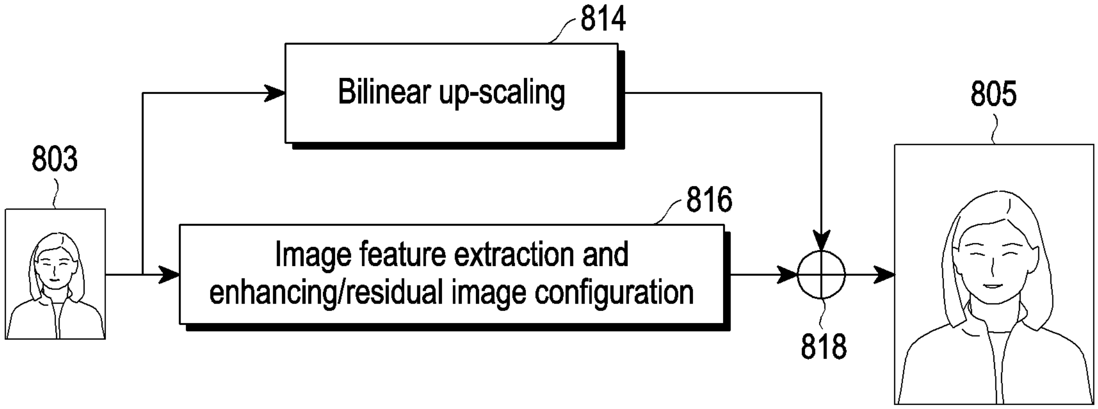
FIG. 8B is a view illustrating an AI model for up-scaling according to an embodiment of the disclosure.

FIG. 8B is a view illustrating an AI model for up-scaling according to an embodiment of the disclosure.

Meanwhile, in FIG. 8B, a process of applying an AI model has been described, but the embodiment of FIG. 8B may be performed during a training process, which is described with reference to FIGS. 8C and 8D.

Referring to FIG. 8B, according to the comparative example, the electronic device 101 may up-scale the second image 803 to a third image 805 using an AI model for up-scaling. The AI model according to the comparative example may include, but is not limited to, a portion for Bilinear up-scaling 814, a portion 816 for image feature extraction and enhancement/residual image configuration, and an image adder 818. The portion (or AI model) for Bilinear up-scaling 814 may perform up-scaling based on, e.g., the Bilinear method, but the up-scaling method is not limited thereto. Based on the Bilinear method, e.g., the third image 805 having a resolution 4 times that of the second image 803 may be generated, but is not limited thereto. The portion for Bilinear up-scaling may be a portion in ResNet except for a portion corresponding to Residual. The portion 816 for image feature extraction and enhancing/residual image configuration is a portion corresponding to the residual in ResNet, and may include, e.g., a convolution layer, but is not limited thereto, and may include a plurality of sub-AI structures. The adder 818 may be an adder capable of adding the original image (the up-scaled original image in this comparative example) defined in ResNet and the image corresponding to residual. As described above, according to the comparative example, a third image 805 that is an up-scaled image based on ResNet may be provided. However, as described above, the AI model according to the comparative example does not use the information related to the bitrate. For example, the AI model for down-scaling described with reference to FIG. 8A and the AI model for up-scaling described with reference to FIG. 8B may be trained together, which is described with reference to FIGS. 8C and 8D.

Figure 8C:
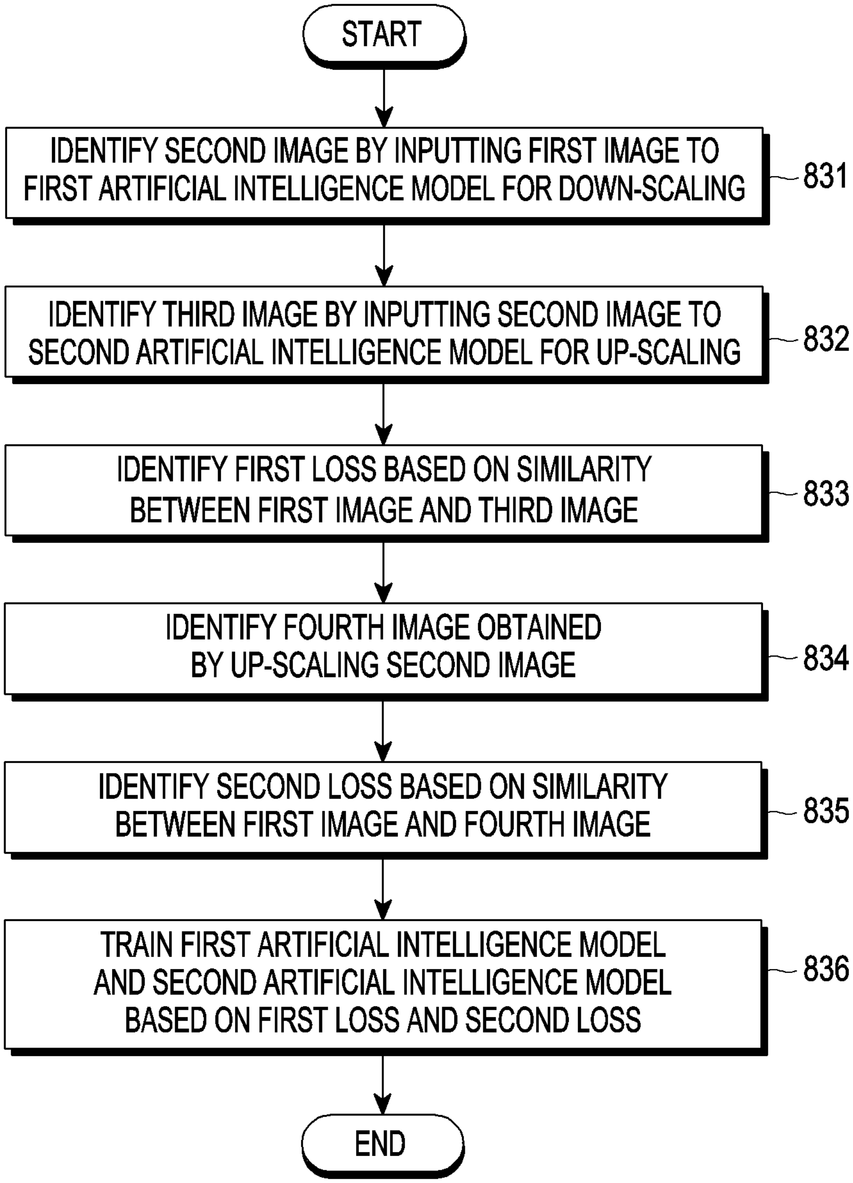
FIG. 8C is a flowchart illustrating training an AI model for down-scaling and an AI model for up-scaling according to an embodiment of the disclosure.

FIG. 8C is a flowchart illustrating training an AI model for down-scaling and an AI model for up-scaling according to an embodiment of the disclosure. The embodiment of FIG. 8C is described with reference to FIG. 8D.

Figure 8D:
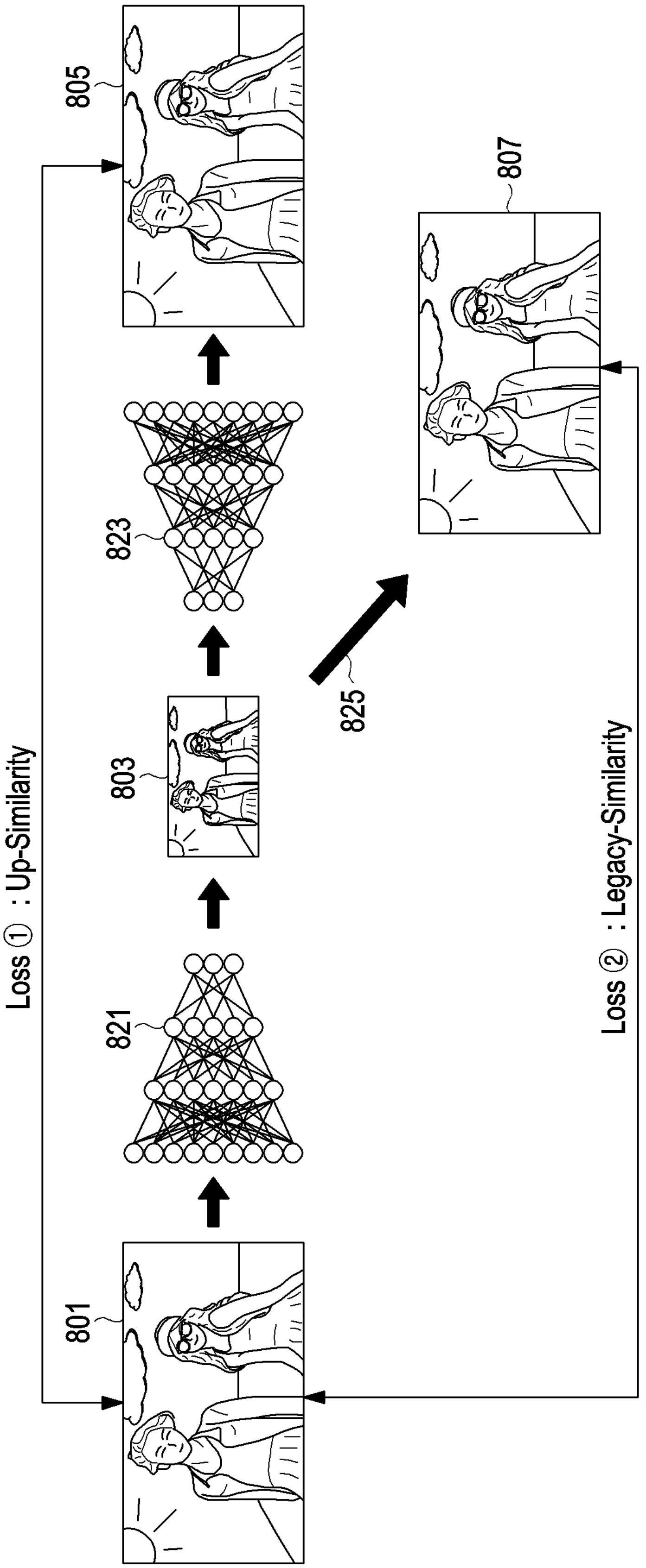
FIG. 8D is a view illustrating training an AI model for down-scaling and an AI model for up-scaling according to an embodiment of the disclosure.

FIG. 8D is a view illustrating training an AI model for down-scaling and an AI model for up-scaling according to an embodiment of the disclosure.

According to a comparative example and/or an embodiment of the disclosure, training of at least one AI model may be performed by a trainer. The training may be performed, e.g., by the server 108 (or may be another computing device) and/or by the electronic device 101 executing the AI model.

It may be understood that the operation performed by the trainer in the disclosure is performed by the electronic device 101 and/or the server 108.

Referring to FIGS. 8C and 8D together, in operation 831, the trainer may identify the second image 803 by inputting the first image 801 to a first AI model 821 for down-scaling. The first AI model 821 may be, e.g., the ResNet described with reference to FIG. 8A, but is not limited thereto. In operation 832, the trainer may identify the third image 805 by inputting the second image 803 to a second AI model 823 for up-scaling. The second AI model 823 may be, e.g., the ResNet described with reference to FIG. 8B, but is not limited thereto. In operation 833, the trainer may identify a first loss Loss1 (Up-Similarity) based on the similarity between the first image 801 and the third image 805. In operation 834, the trainer may identify a fourth image 807 obtained by up-scaling the second image 803. For example, the trainer may identify the fourth image 807 based on an up scaler 825 using the lanczos method, but is not limited thereto. In operation 835, the trainer may identify the second loss Loss2 (Legacy-Similarity) based on the similarity between the first image 801 and the fourth image 807. In operation 836, the trainer may train the first AI model 821 and the second AI model 823 based on the first loss Loss1 and the second loss Loss2. For example, the total loss may be as shown in Equation 3.

$$\text{Total Loss}=\alpha\cdot\text{Loss1}+\beta\text{Loss2} \quad \text{Equation 3}$$

In Equation 3, $\alpha$ and $\beta$ may be weights. The trainer may perform training to minimize total losses. As described above, the first AI model 821 for down-scaling and the second AI model 823 for up-scaling may be trained together. The loss and/or calculation of the loss may be based on, e.g., a mean square error (L2) loss, a negative structural similarity index (SSIM) loss, or an absolute error after Gaussian filter (GL1) loss, but this is exemplary and the type is not limited thereto.

Figure 8E:
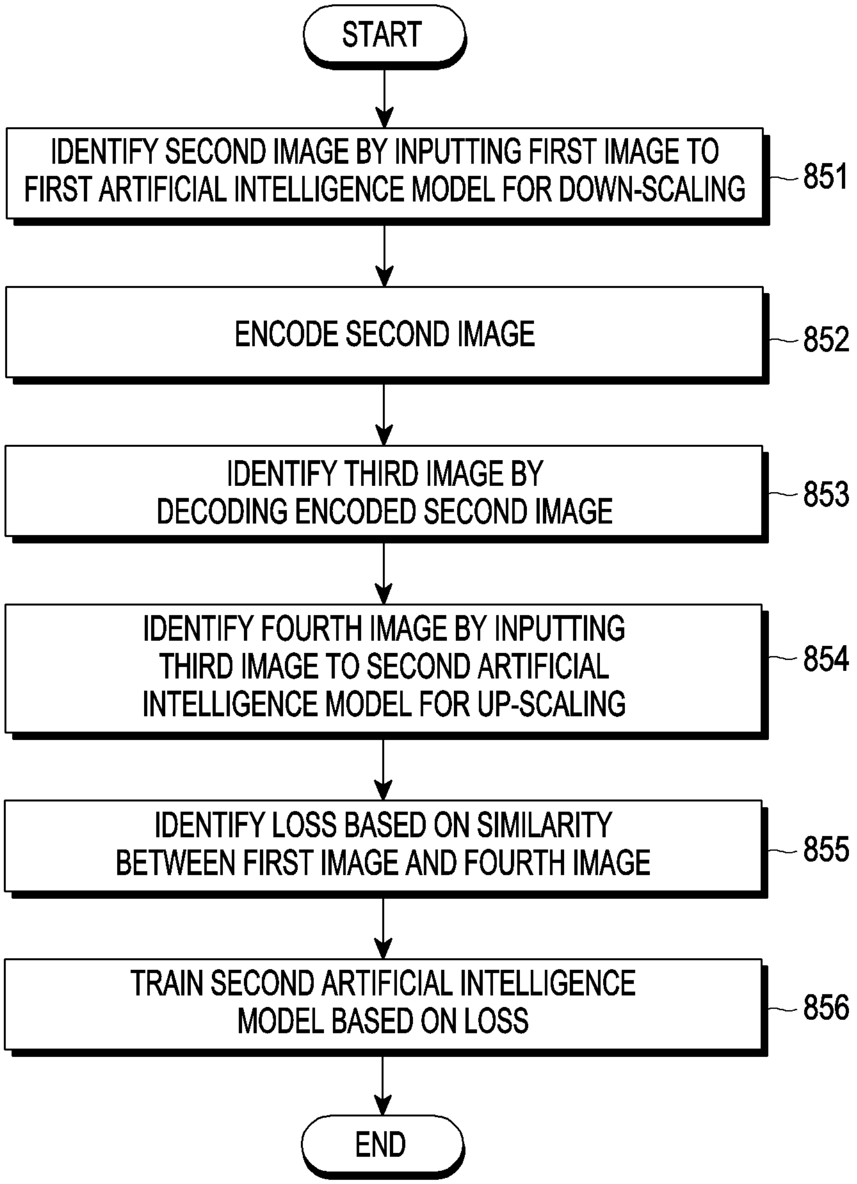
FIG. 8E is a flowchart illustrating training an AI model for down-scaling and an AI model for up-scaling according to an embodiment of the disclosure.

FIG. 8E is a flowchart illustrating training an AI model for down-scaling and an AI model for up-scaling according to an embodiment of the disclosure. The embodiment of FIG. 8E is described with reference to FIG. 8F.

Figure 8F:
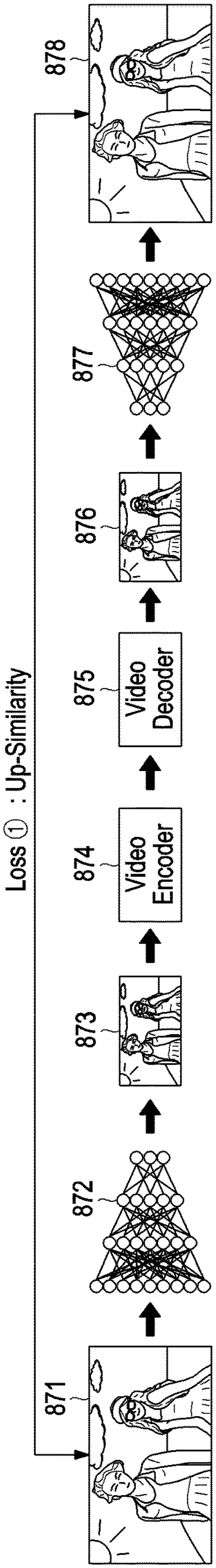
FIG. 8F is a view illustrating training an AI model for up-scaling according to an embodiment of the disclosure.

FIG. 8F is a view illustrating training an AI model for up-scaling according to an embodiment of the disclosure.

Referring to FIGS. 8E and 8F together, in operation 851, the trainer may identify a second image 873 by inputting a first image 871 to a first AI model 872 for fixed down-scaling. In the comparative example of FIGS. 8E and 8F, the parameter of the first AI model 872 may be set to have a fixed value. For example, the parameter of the first AI model 872 may be determined based on the training described with reference to FIGS. 8C and 8D, and since the parameter of the first AI model 872 is not additionally trained in the embodiments of FIGS. 8E and 8F, it will be understood by one of ordinary skill in the art that the word "fixed" is used. In operation 852, the trainer may encode the second image 873 using an encoder 874. In operation 853, the trainer may identify a third image 876 by decoding the encoded second image using a decoder 875. For example, encoding and/or decoding may use a fixed QP value. In actual video call streaming, a constant/variable bitrate mode (CBR/VBR) may be used, and the bitrate may be changed in real time according to the communication environment. In operation 854, the trainer may identify a fourth image 878 by inputting the third image 876 to a second AI model 877 for up-scaling. In operation 855, the trainer may identify a loss Loss1 (Up-Similarity) based on the similarity between the first image 871 and the fourth image 878. In operation 856, the trainer may train the second AI model 877 based on the loss Los1. The trainer may train the second AI model 877 to minimize the loss. For example, the trainer may perform training set based on FIGS. 8C and 8D and/or training set based on FIGS. 8E and 8F, thereby training the AI model for down-scaling and/or the AI model for up-scaling.

Figure 9A:
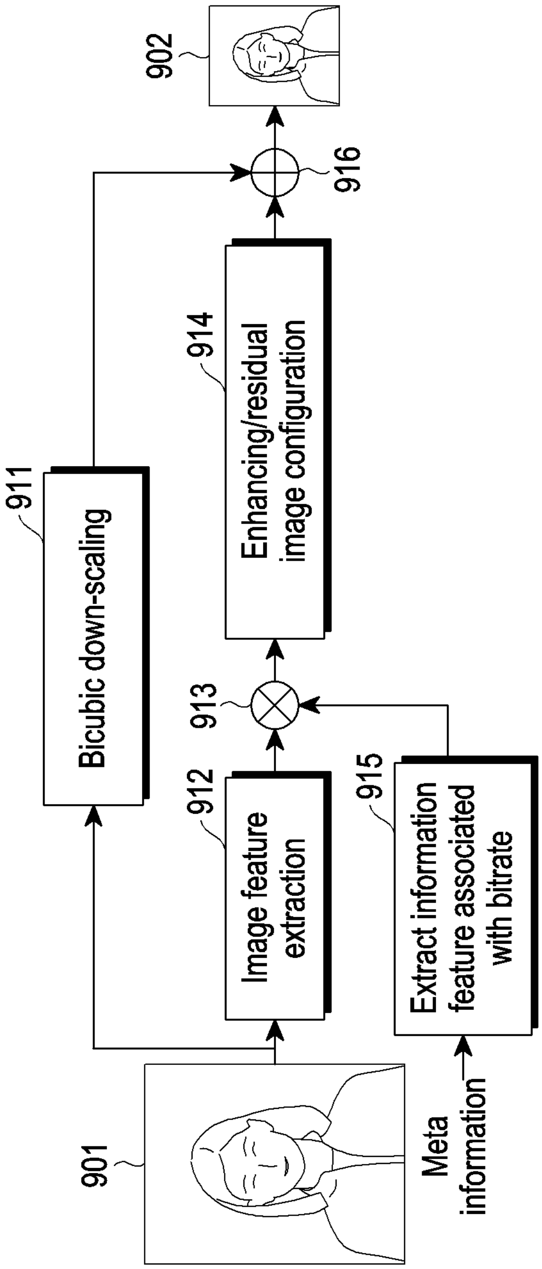
FIG. 9A is a view illustrating an AI model for down-scaling according to an embodiment of the disclosure.

FIG. 9A is a view illustrating an AI model for down-scaling according to an embodiment of the disclosure.

Referring to FIG. 9A, according to an embodiment of the disclosure, the electronic device 101 may identify a first image 901 captured (or selected from the training data set) by the camera module 180. The electronic device 101 may down-scale the first image 901 to a second image 902 using an AI model for down-scaling. Meanwhile, in FIG. 9A, a process of applying an AI model has been described, but the embodiment of FIG. 9A may be performed during a training process, which is described with reference to FIGS. 9C and 9D. In the embodiment of FIG. 9A, the AI model may have, e.g., the structure of ResNet. Meanwhile, ResNet may be trained to enhance overall resolution by enhancing the residual line rather than image scaling, but is not limited thereto.

The AI model according to an embodiment of the disclosure may include, but is not limited to, a portion 911 for Bicubic down-scaling, a portion 912 for image feature extraction, an image multiplier 913, a portion 914 for enhancing/residual image configuration, a portion 915 for extracting information features associated with the bitrate, and an image adder 916. The portion 911 (or AI model) for Bicubic down-scaling may perform down-scaling based on, e.g., the Bicubic method, but the down-scaling method is not limited thereto. Based on the Bicubic method, e.g., the second image 902 having a resolution ¼ times that of the first image 901 may be generated, but is not limited thereto. The portion 911 for down-scaling may be a portion in ResNet except for a portion corresponding to Residual. The image feature extractor 912 may include, e.g., at least one convolution layer for extracting a feature, but this is merely an example, and it will be understood by one of ordinary skill in the art that implementation of the image feature extractor 912 is not limited thereto, and other neural networks, such as an RNN may also be used.

According to an embodiment of the disclosure, the portion 915 for extracting the information feature associated with the bitrate may be configured to receive the information (e.g., BPP) associated with the bitrate as an input value and output the feature. Meanwhile, other values other than the BPP may be implemented as input values to the portion 915, and input information to the portion 915 may be referred to as meta information. The meta information may include, e.g., the BPP as information associated with the bitrate, but this is merely an example and may also include, but is not limited to, the specifications of the camera module 180, the location where the video call is performed, the mode of the camera module 180 (e.g., the front photographing mode or the rear photographing mode), the network state, the network type, whether lighting is used during call, and/or video frame-related information (e.g., the face-to-face video frame, the roadside video frame, the multi-person video frame, and no-person video frame, but not limited thereto). For example, the portion 915 for extracting the information feature associated with the bitrate may include at least one fully-connected layer. The portion 915 for extracting the information feature associated with the bitrate may be implemented as a dense network, but this is exemplary and the type thereof is not limited. The multiplier 913 may cross-multiply the output of the portion 912 and the output of the portion 915. The portion 914 for enhancing/residual image configuration may receive the cross-multiplication result, perform enhancement/residual configuration, and output the result. The adder 916 may add the output from the portion 914 for enhancing/residual image configuration to the output from the portion 911 for down-scaling, and thus the second image 902 may be output. In contrast to the AI model described with reference to FIG. 8A, the AI model described with reference to FIG. 9A may receive the high-resolution image (e.g., the first image 901) and the value (e.g., BPP) associated with the bitrate as input values, and may output the low-resolution image (e.g., the second image 902). Accordingly, training on various bitrates (or codec parameters) may be performed, and an AI model for an environment in which codec parameters are changed according to a change in the communication environment may be provided. The AI model may be trained to enhance the residual line, but is not limited thereto. For example, to enhance the residual line, the residual line may be used for the luma (Y) channel, but is not limited thereto. For example, upon encoding in a relatively low bitrate range, a bitstream of a relatively lower quality than a relatively high bitrate range is generated, and thus a residual line of up-scaling in a relatively low bitrate range may be supposed to have a stronger effect.

Figure 9B:
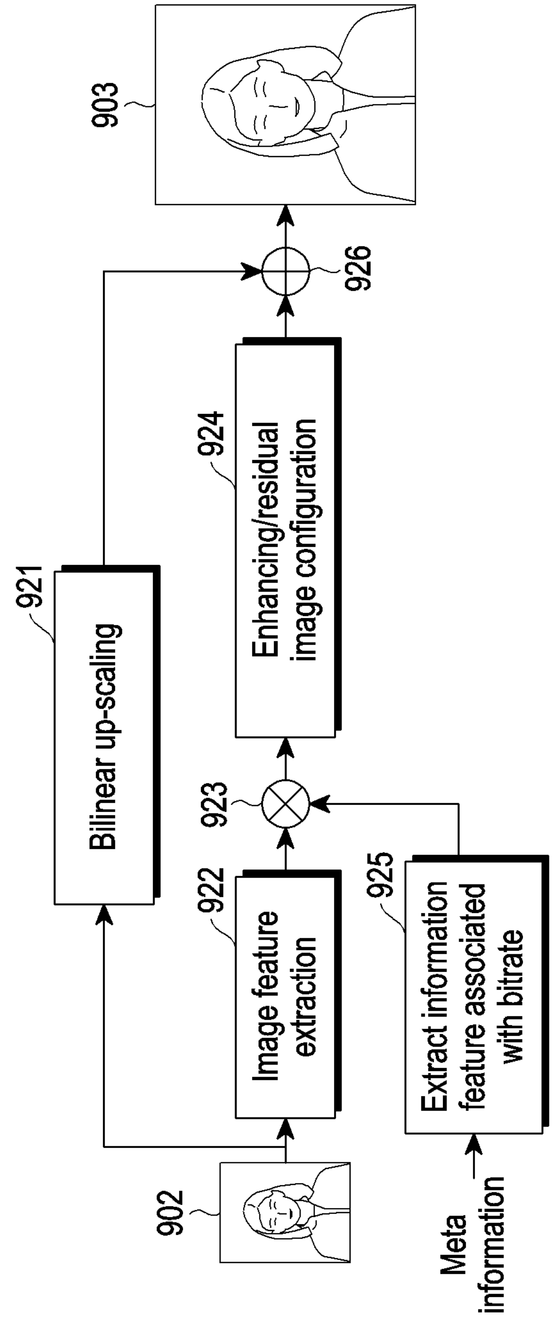
FIG. 9B is a view illustrating an AI model for up-scaling according to an embodiment of the disclosure.

FIG. 9B is a view illustrating an AI model for up-scaling according to an embodiment of the disclosure.

Referring to FIG. 9B, according to an embodiment of the disclosure, the electronic device 101 may identify the second image 902 having a relatively low resolution. The electronic device 101 may up-scale the second image 902 to the third image 903 using an AI model for up-scaling. Meanwhile, in FIG. 9B, a process of applying an AI model has been described, but the embodiment of FIG. 9B may be performed during a training process, which is described with reference to FIGS. 9C and 9D. In the embodiment of FIG. 9B, the AI model may have, e.g., the structure of ResNet. Meanwhile, ResNet may be trained to enhance overall resolution by enhancing the residual line rather than image scaling, but is not limited thereto.

According to an embodiment of the disclosure, the AI model for up-scaling may include a portion 921 for Bilinear up-scaling, a portion 922 for image feature extraction, a multiplier 923, a portion 924 for enhancing/residual image configuration, a portion 925 for extracting information features associated with the bitrate, and an adder 926. The portion 921 for Bilinear up-scaling may up-scale the second image 902 to output the up-scaled image. The up-scaled image may have resolution four times higher than that of the second image 902, but is not limited thereto, and the Bilinear method is also exemplary. The portion 922 for image feature extraction and/or the portion 924 for enhancing/residual image configuration may include at least one convolution layer, but this is not limited thereto. The portion 925 for extracting the information feature associated with the bitrate may receive, e.g., information (e.g., BPP) associated with the bitrate and output a feature corresponding thereto. The portion 925 may include, e.g., a fully-connected layer, but is not limited thereto. The portion 925 may be implemented as, e.g., a dense network, but is not limited thereto. Meanwhile, other values other than the BPP may be implemented as input values to the portion 925, and input information to the portion 925 may be referred to as meta information. The multiplier 923 may cross-multiply the output of the portion 922 and the output of the portion 925. The portion 924 for enhancing/residual image configuration may receive the cross-multiplication result, perform enhancement/residual configuration, and output the result. The adder 926 may add the output from the portion 924 for enhancing/residual image configuration to the output from the portion 921 for up-scaling, and thus the third image 903 may be output. In contrast to the AI model described with reference to FIG. 8B, the AI model described with reference to FIG. 9B may receive the low-resolution image (e.g., the second image 902) and the value (e.g., BPP) associated with the bitrate as input values, and may output the high-resolution image (e.g., the third image 903). Accordingly, training on various bitrates (or codec parameters) may be performed, and an AI model for an environment in which codec parameters are changed according to a change in the communication environment may be provided. Meanwhile, as described with reference to FIGS. 8C and 8D, the AI model for up-scaling and the AI model for down-scaling may be trained together, and this is described with reference to FIGS. 9C and 9D.

Figure 9C:
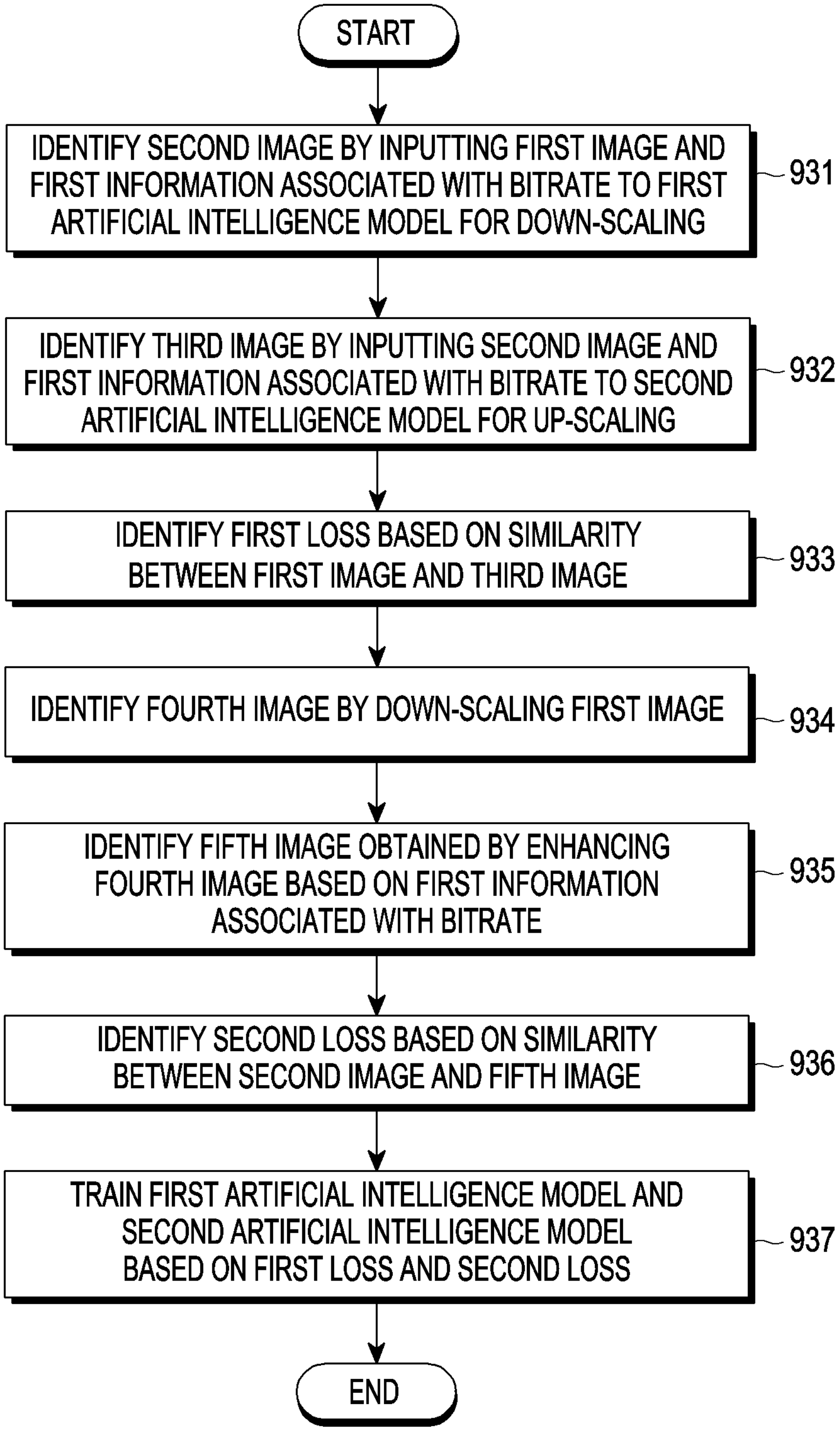
FIG. 9C is a flowchart illustrating training an AI model for down-scaling and an AI model for up-scaling according to an embodiment of the disclosure.

FIG. 9C is a flowchart illustrating training an AI model for down-scaling and an AI model for up-scaling according to an embodiment of the disclosure. The embodiment of FIG. 9C is described with reference to FIG. 9D.

Figure 9D:
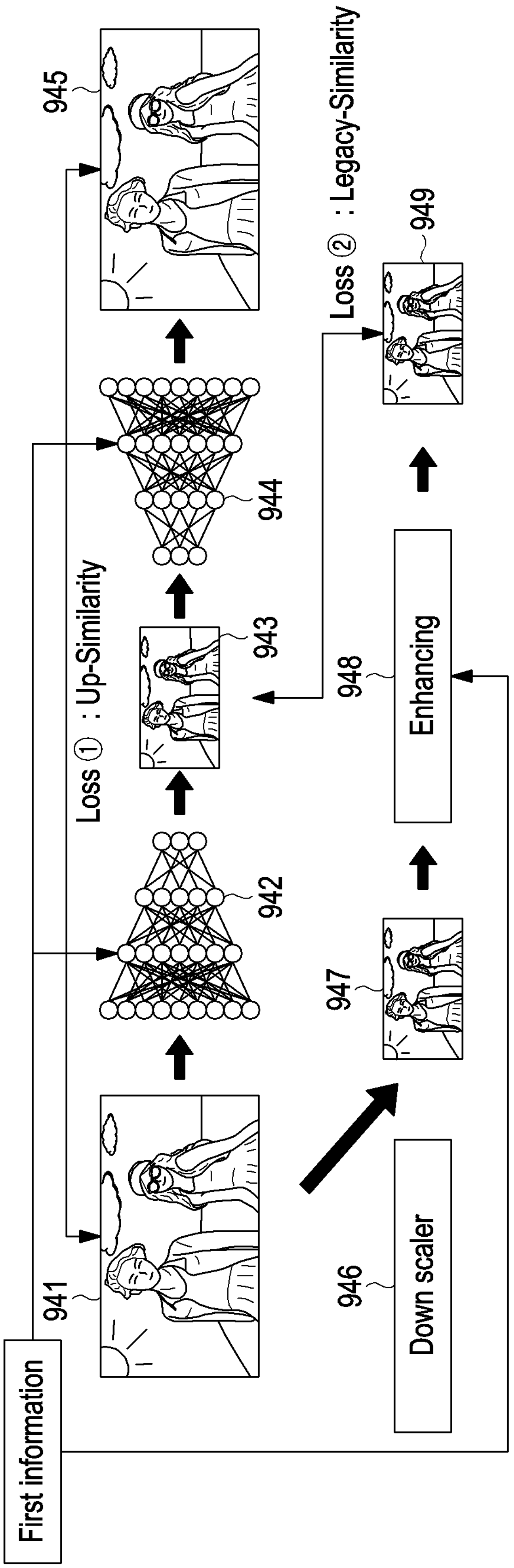
FIG. 9D is a view illustrating training an AI model for down-scaling and an AI model for up-scaling according to an embodiment of the disclosure.

FIG. 9D is a view illustrating training an AI model for down-scaling and an AI model for up-scaling according to an embodiment of the disclosure.

Referring to FIGS. 9C and 9D together, in operation 931, the trainer may identify a second image 943 by inputting a first image 941 and the first information to the first AI model 942 for down-scaling. The first AI model 942 may be, e.g., the ResNet described with reference to FIG. 9A, but is not limited thereto. As described with reference to FIG. 9A, the first AI model 942 may receive first information together with the high-resolution image (e.g., the first image 941) as input values. The first information may be, e.g., meta information including BPP, which is information associated with the bitrate, and is not limited thereto. In operation 932, the trainer may identify a third image 945 by inputting the second image 943 and the first information to a second AI model 944 for up-scaling. The second AI model 944 may be, e.g., the ResNet described with reference to FIG. 9B, but is not limited thereto. As described with reference to FIG. 9B, the second AI model 944 may receive first information together with the low-resolution image (e.g., the second image 943) as input values.

In operation 933, the trainer may identify a first loss Loss1 (Up-Similarity) based on the similarity between the first image 941 and the third image 945. In operation 934, the trainer may identify the fourth image 947 obtained by down-scaling the first image 941. For example, the trainer may identify the fourth image 947 based on a down scaler 946 to downscale the first image 941 using the lanczos method, but is not limited thereto. In operation 935, the trainer may identify a fifth image 949 obtained by enhancing the fourth image based on the first information associated with the bitrate. For example, the trainer may output the fifth image 949 using an enhancer 948 based on the first information, but is not limited thereto, and an enhancing process is described below. In operation 936, the trainer may identify the second loss Loss2 (Legacy-Similarity) based on the similarity between the second image 943 and the fifth image 949. In operation 937, the trainer may train the first AI model 942 and the second AI model 944 based on the first loss Loss1 and the second loss Loss2. For example, the total loss may be as shown in Equation 3 described above. The trainer may perform training to minimize total losses. As described above, the first AI model 942 for down-scaling and the second AI model 944 for up-scaling may be trained together. The loss and/or calculation of the loss may be based on, e.g., a mean square error (L2) loss, a negative structural similarity index (SSIM) loss, or an absolute error after Gaussian filter (GL1) loss, but this is exemplary and the type is not limited thereto. For training, e.g., supervised learning in a mini batch gradient decent method may be used, but is not limited thereto. Each of the training data used for each training session may include various resolutions, framerates, and/or bitrates, and accordingly, AI models robust to codec parameters that change according to the network environment may be provided. For example, a perceptual filter may be used in the enhancing process of the enhancer 948. As the perceptual filter is used, an effect of changing the performance of the codec according to the state of the input image may be expressed. As the perceptual filter is used, the quality of encoding may be enhanced. If an image is provided, any one of an adaptive weighted average (AWA), a threshold bilateral (TBil), or a just noticeable-distortion (JND) profiled motion-compensated residue, which is a pre-encoding optimizer filter, may be used as the perceptual filter, but is not limited thereto. The goal of the training may be, e.g., that the result of performing down-scaling and up-scaling is substantially the same (or similar) to that for the original image. The goal of the training may be substantially the same (or similar) to, e.g., a result of down-scaling by a down scaler of an AI model of the related art for down-scaling.

Figure 9E:
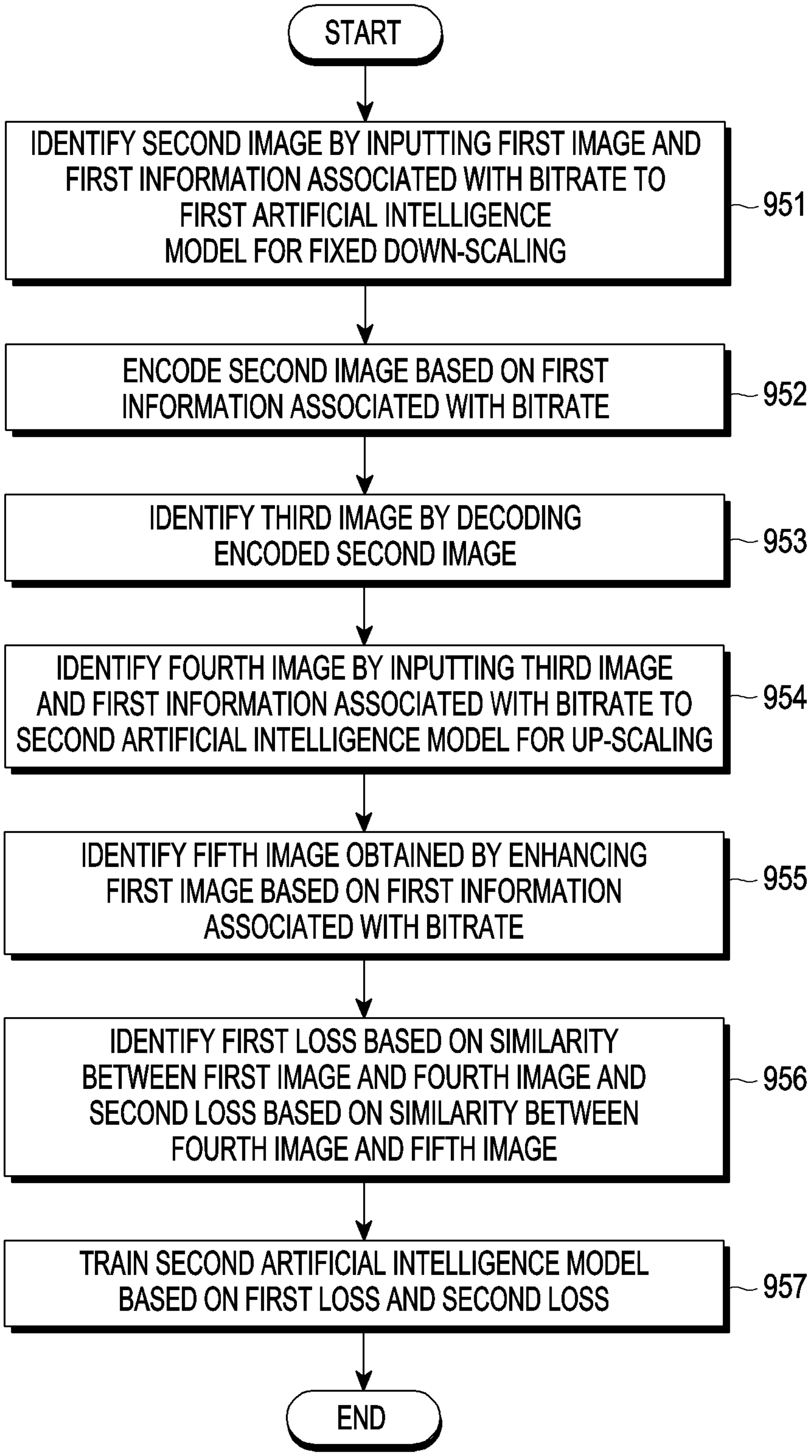
FIG. 9E is a flowchart illustrating training an AI model for down-scaling and an AI model for up-scaling according to an embodiment of the disclosure.

FIG. 9E is a flowchart illustrating training an AI model for down-scaling and an AI model for up-scaling according to an embodiment of the disclosure. The embodiment of FIG. 9E is described with reference to FIG. 9F.

Figure 9F:
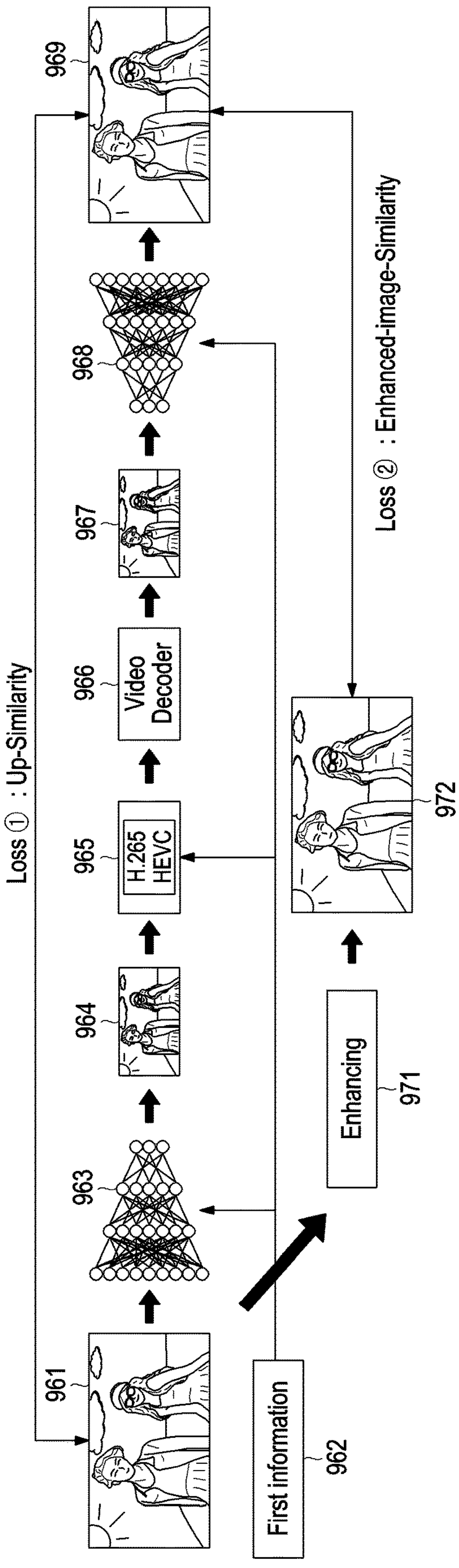
FIG. 9F is a view illustrating training an AI model for up-scaling according to an embodiment of the disclosure.

FIG. 9F is a view illustrating training an AI model for up-scaling according to an embodiment of the disclosure.

Referring to FIGS. 9E and 9F together, in operation 951, the trainer may identify a second image 964 by inputting a first image 961 and first information 963 to the first AI model 963 for fixed down-scaling. In FIGS. 9E and 9F, a second AI model 968 for up-scaling may be trained, and the parameter of the first AI model 963 may be set to have the fixed value. In operation 952, the trainer may encode the second image 964 using an encoder 965, based on the first information associated with the bitrate. In operation 953, the trainer may identify a third image 967 by decoding the encoded second image using a decoder 966. For example, encoding and/or decoding may use a fixed quantization parameter (QP) value. In operation 954, the trainer may identify a fourth image 969 by inputting the third image 967 and a first information 962 associated with the bitrate to the second AI model 968 for up-scaling. In operation 955, the trainer may identify the fifth image 972 obtained by enhancing (971) the first image 961 based on the first information 962 associated with the bitrate. In operation 956, the trainer may identify a first loss Loss1 (Up-similarity) based on the similarity between the first image 961 and the fourth image 969 and a second loss Loss2 (Enhanced-image-Similarity) based on the similarity between the fourth image 969 and the fifth image 972. In operation 957, the trainer may train the second AI model 968 based on the first loss Loss1 and the second loss Loss2. For example, the total loss may be expressed as Equation 3 described above, and $\beta$ may be $1-\alpha$. $\alpha$ may be set based on the BPP, but is not limited. The trainer may train the second AI model 968 to minimize the total loss. For example, the trainer may perform training set based on FIGS. 9C and 9D and/or training set based on FIGS. 9E and 9F, thereby training the AI model for down-scaling and/or the AI model for up-scaling. The tool for enhancing 971 is described with reference to FIG. 10. Training may be performed with the aim of becoming similar to the original video frame in a relatively high bitrate range, and because codec loss is already high in a relatively low bitrate range, training for enhancing codec loss may be performed. Meanwhile, for the training of FIGS. 9C and 9D, the loss function may use the distance-based metric L1L2, L1, or L2, and for the training of FIGS. 9E and 9F, the loss function may use the similarity measurement method of SSIM or GL1, but this is not limited thereto.

Figure 10:
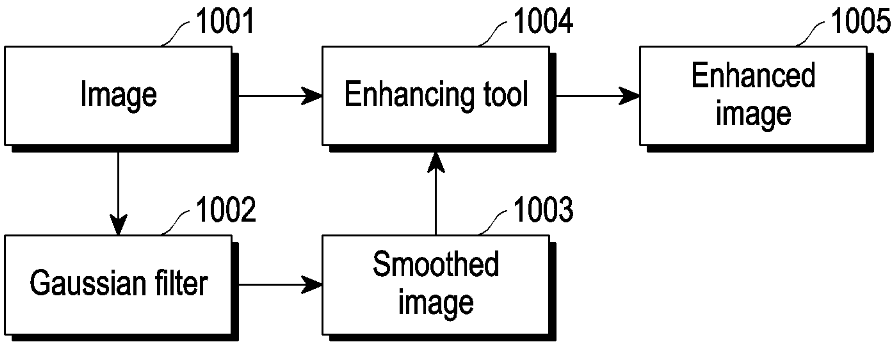
FIG. 10 is a view illustrating image enhancing according to an embodiment of the disclosure.

FIG. 10 is a view illustrating image enhancing according to an embodiment of the disclosure.

Referring to FIG. 10, according to an embodiment of the disclosure, the trainer may smooth an image 1001 using a Gaussian filter 1002. The Gaussian filter 1002 may smooth the image 1001, and thus a smoothed image 1003 may be provided. An enhancing tool 1004 may provide an enhanced image 1005 using the smoothed image 1003 and the image 1001. For example, the enhanced image 1005 may be represented by Equation 4.

$$\text{Enhanced image}=\text{image}+k(\text{image}-\text{smoothed image}) \qquad \text{Equation 4}$$

In Equation 4, k may be a value between [0.0, 10.0], and k may be set such that the score (e.g., VMAF) has a maximum value. Meanwhile, the above-described enhancing method is merely exemplary, and it will be understood by one of ordinary skill in the art that the enhancing method is not limited. As described above, the enhanced image 1005 may be provided, and as described with reference to FIG. 9F, the enhanced image (the fifth image 972) may be used in training. As the enhanced image is used for training, an AI model capable of providing an output closer to the original image may be provided.

Figure 11A:
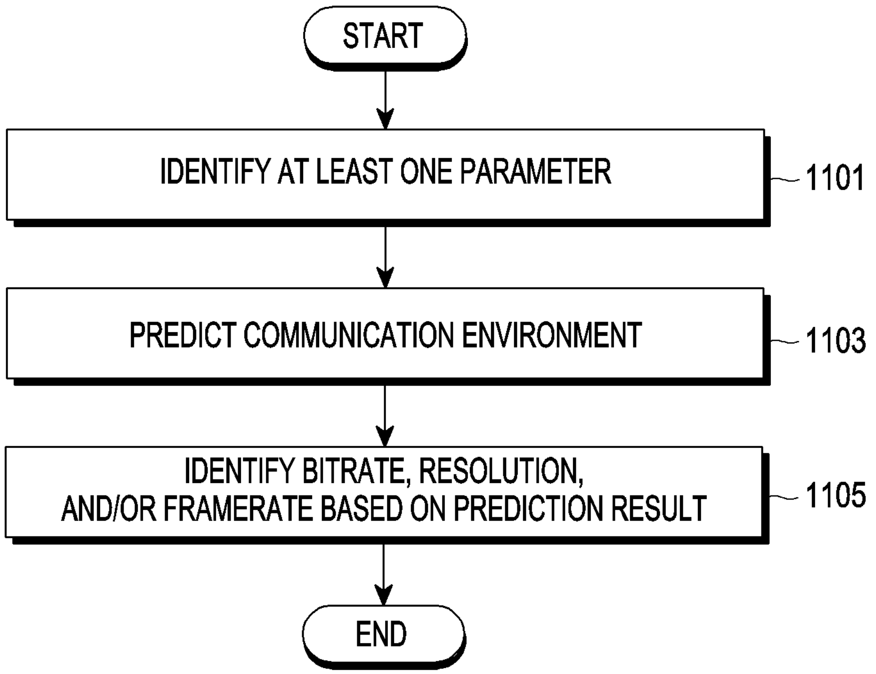
FIG. 11A is a flowchart illustrating a method of operating an electronic device according to an embodiment of the disclosure.

FIG. 11A is a flowchart illustrating a method of operating an electronic device according to an embodiment of the disclosure. The embodiment of FIG. 11A is described with reference to FIG. 11B.

Figure 11B:
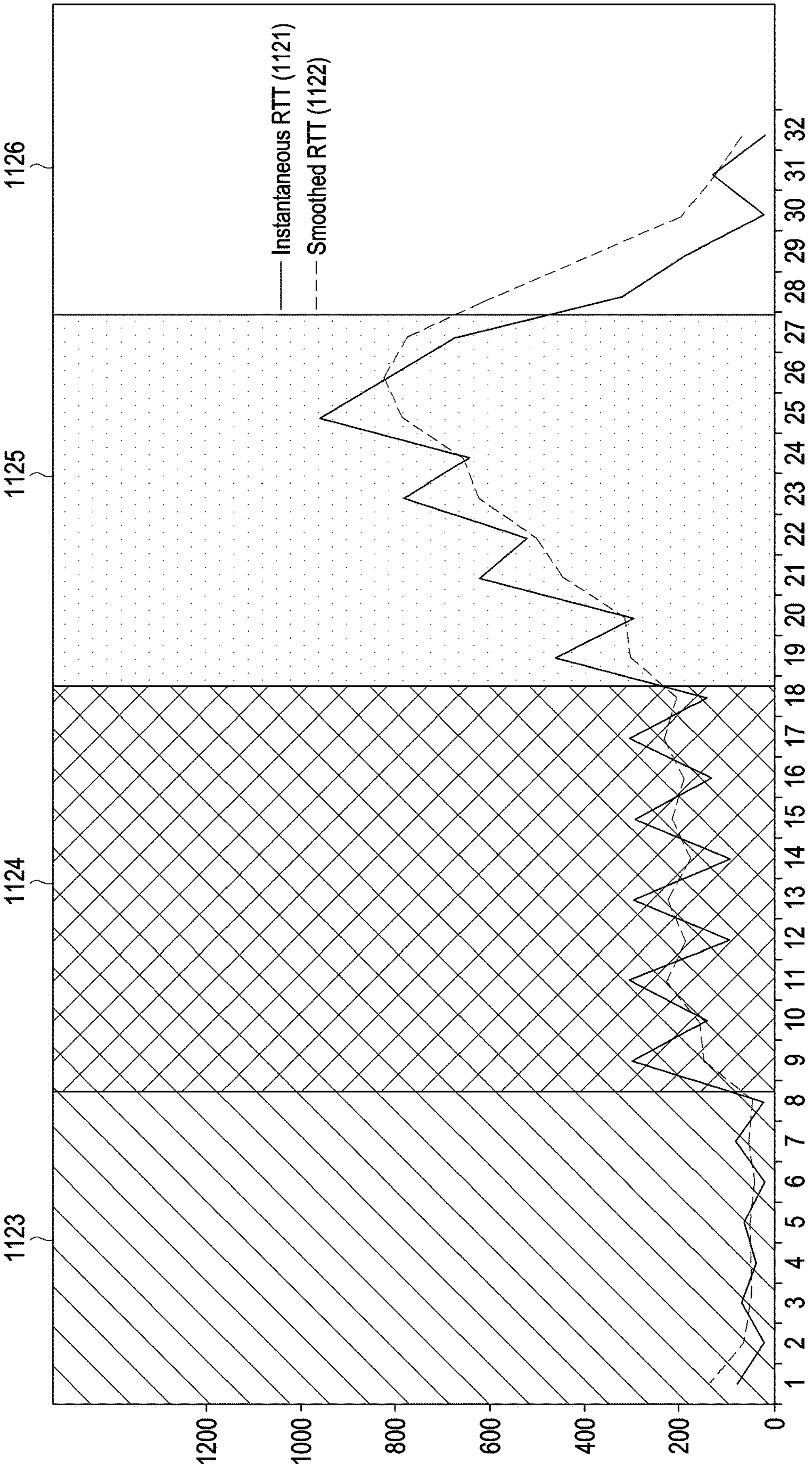
FIG. 11B is a view illustrating a communication environment according to an embodiment of the disclosure.

FIG. 11B is a view illustrating a communication environment according to an embodiment of the disclosure.

Referring to FIGS. 11A and 11B, according to an embodiment of the disclosure, the electronic device 101 (e.g., the processor 120) may identify at least one parameter in operation 1101. In operation 1103, the electronic device 101 may predict a communication environment based on at least one parameter. In operation 1105, the electronic device 101 may identify the bitrate, the resolution, and/or the framerate based on the prediction result. For example, the electronic device 101 may predict the communication environment based on the RTCP, set a relatively high bitrate when the communication environment is relatively good, and set a relatively low bitrate when the communication environment is relatively bad. The bitrate may be set in real time (or semi-real time), and the corresponding framerate and/or resolution may also be set in real time (or semi-real time).

For example, the electronic device 101 may be required to predict a bandwidth allowed by the network, determine a bitrate within the allowable value, and transmit a packet. For example, the electronic device 101 may predict a bandwidth based on a parameter to be fed back based on the RTCP. In one example, the communication environment may be classified into three states 1123, 1124, and 1125 as shown in FIG. 11B. The first state 1123 may be referred to as, e.g., an "unloaded state", and a delay, a packet loss, and/or a packet drop may not occur in the first state 1123. The second state 1124 may be referred to as, e.g., a "loaded state", and in the second state 1124, the load may be close to the bandwidth allowed by the network or exceed by a threshold value or less. In the second state 1124, e.g., fluctuation of the delay may occur, or a relatively large delay may occur. For example, when a relatively large delay is identified, a repeated increase/decrease in delay is identified, and/or a packet loss of a relatively low level is identified, the communication environment may be identified as the second state 1124, but is not limited thereto. The third state 1125 may be referred to as, e.g., a "congested state", and in the third state 1125, a relatively large number of packet drops may occur. For example, a bottleneck may occur in the entity of the network, and accordingly, when the load exceeds the allowed bandwidth, a continuous delay may occur, or a relatively large packet loss may occur. The packet loss rate may be identified based on the loss fraction in the RR of the RTCP. For example, the instantaneous RTT 1121 and the smoothed RTT 1122 may have relatively small values in the first state 1123, and may also have relatively small variations. The instantaneous RTT 1121 and the smoothed RTT 1122 may have a relatively larger value in the second state 1124 than in the first state 1123. The instantaneous RTT 1121 and the smoothed RTT 1122 may continuously increase, e.g., in the third state 1125, if there is no timeout. In a state 1126 in which the congestion is resolved, the instantaneous RTT 1121 and the smoothed RTT 1122 may be reduced. Table 1 shows an example of classifying the state of a communication environment for each parameter. Meanwhile, the example of Table 1 may be set to differ for each network (e.g., for each 4G, 5G, and WIFI), but is not limited thereto.

TABLE 1

| | first state 1123 | second state 1124 | third state 1125 |
|---|---|---|---|
| One way delay(OWD) | <prevOWD × 1.2 | >=prevOWD × 1.2 | >=prevOWD × 1.2 |
| Perceived bitrate | Same as Sending bitrate | Smaller than Sending bitrate | Smaller than Sending bitrate |
| Packet loss rate | Loss not identified | <=5%, or loss equal to or less than threshold period | >5%, or loss exceeding threshold period |

As shown in Table 1, when the one-way delay measured at the current time point is less than 1.2 times the previous one-way delay (prevOWD), the state may be classified as the first state 1123, and when the one-way delay is 1.2 times or more, the state may be classified as the second state 1124 or the third state 1125. One-way delay may be predicted based on, e.g., RTT. When the communication environment is relatively poor, the one-way delay may be increased. The RTT may be calculated based on information about the RTCP SR and/or RR. Meanwhile, whether it is less than 1.2 times the prevOWD is merely exemplary, and the numerical value is not limited, or whether it is in the first state 1123 may be determined depending on whether it is less than the absolute value (e.g., 50 ms) of the delay.

Meanwhile, when the communication environment is relatively good, the total amount of sending bits and the total amount of receiving bits may be the same. However, when the communication environment is relatively poor, the total amount of receiving bits may be lower than the total amount of sending bits. As shown in Table 1, when the perceived bitrate is the same as the sending bitrate, it may be classified as the first state 1132. When the perceived bitrate is smaller than the sending bitrate, it may be classified as the second state 1124 or the third state 1125. The perceived bitrate may refer to an actual bitrate reaching the other side, and when the bandwidth is limited, the perceived bitrate may be highly likely to have a limited bandwidth value. As shown in Table 3, when there is no packet loss, the state may be classified as the first state 1132. When the packet loss rate is less than or equal to the threshold ratio (e.g., 5%) or the packet loss rate is within a designated threshold period (e.g., three cycles), the state may be classified as the second state 1124. For example, when the packet loss rate exceeds the threshold ratio (e.g., 5%) or the packet loss is out of the designated threshold period (e.g., three cycles), the state may be classified as the third state 1125. The packet loss rate may be calculated based on the lost fraction information about the RTCP RR.

Figure 12A:
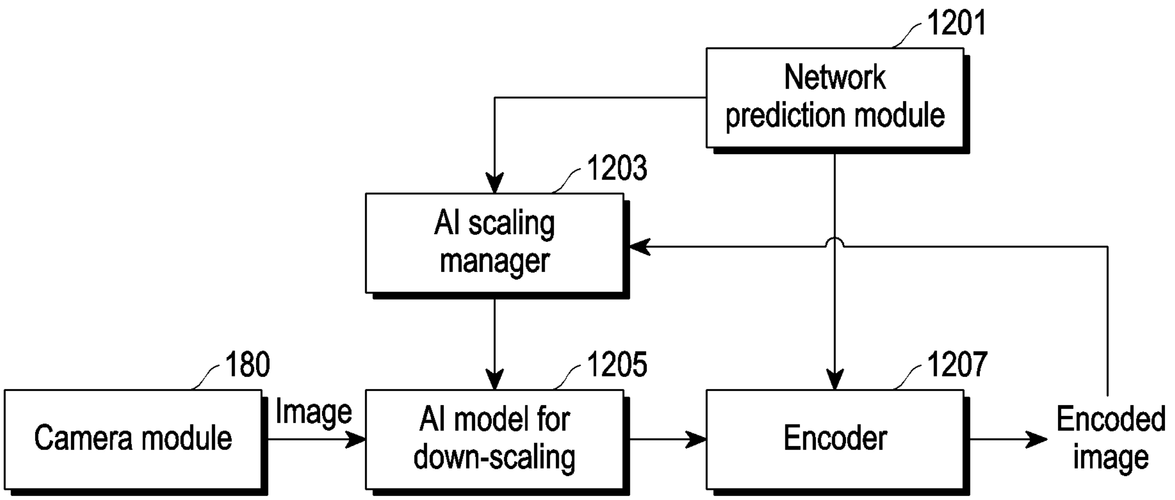
FIG. 12A is a view illustrating image transmission by an electronic device according to an embodiment of the disclosure.

FIG. 12A is a view illustrating image transmission by an electronic device according to an embodiment of the disclosure.

Referring to FIG. 12A, according to an embodiment of the disclosure, the electronic device 101 (e.g., the processor 120) may execute an AI scaling manager 1203. The AI scaling manager 1203 may provide information (e.g., BPP) (or may be referred to as meta information) associated with the bitrate, which is a part of input values to an AI model 1205 for down-scaling. A network prediction module 1201 may provide, e.g., a communication environment or a bitrate corresponding to the communication environment, as described with reference to FIGS. 11A and 11B. The AI scaling manager 1203 may identify the bitrate corresponding to the communication environment provided from the network prediction module 1201 or may identify the bitrate provided from the network prediction module 1201. The AI scaling manager 1203 may identify information (e.g., BPP) associated with the bitrate, based on the identified bitrate. For example, the AI scaling manager 1203 may be provided with camera parameters including the framerate and/or resolution of the camera module 180. The AI scaling manager 1203 may determine the BPP as information associated with the bitrate, based on, e.g., the bitrate, the framerate, or the resolution, but this is merely an example, and it will be understood by one of ordinary skill in the art that information affected by the bitrate may be used as information (or meta information) associated with the bitrate. The AI model 1205 for down-scaling may receive the image (e.g., the high-resolution image) provided from the camera module 180 and information (e.g., the BPP) related to the bitrate provided from the AI scaling manager 1203 as input values and output the low-resolution image. An encoder 1207 may encode the low-resolution image provided from the AI model 1205 for down-scaling to provide the encoded image (or bitstream), which may be transmitted through the communication module 190. The encoder 1207 may perform encoding using, e.g., codec parameters including the bitstream. For example, the bitrate may be set to a previously used bitrate.

According to an embodiment of the disclosure, in one example, the AI scaling manager 1203 may identify the BPP input to the AI model 1205, based on the bitrate provided from the network prediction module 1201 (or identified based on the provided information). In this case, as described in connection with Equation 1, the BPP may be determined as a value obtained by dividing the current bitrate by the product of the framerate and the resolution. Meanwhile, in another example, the AI scaling manager 1203 may identify a value obtained by dividing the average of the sizes of a designated number (e.g., K which may be a natural number of 1 or more) of encoded images by the resolution as the BPP, which may be expressed as Equation 5.

$$BPP = \text{Average encoded size}/\text{resolution} \qquad \text{Equation 5}$$

In Equation 5, "average encoded size" may be the average of the sizes of the designated number of (K) encoded images, and "resolution" may be the resolution.

The AI scaling manager 1203 may select one of the BPP (e.g., the BPP according to Equation 1) associated with the communication environment or the BPP (e.g., the BPP according to Equation 5) associated with the average of the sizes of the encoded images and provide the selected BPP to the AI model 1205. In an example, when the number of the accumulated encoded images is less than a designated number K, the AI scaling manager 1203 may select the BPP (e.g., the BPP according to Equation 1) associated with the communication environment. In an example, the AI scaling manager 1203 may select the BPP (e.g., the BPP according to Equation 1) associated with the communication environment when the bitrate identified based on the network prediction module 1201 changes sharply (or when the communication environment changes sharply or packet loss is large). Meanwhile, the above-described selection conditions of the BPP are exemplary and are not limited thereto.

Figure 12B:
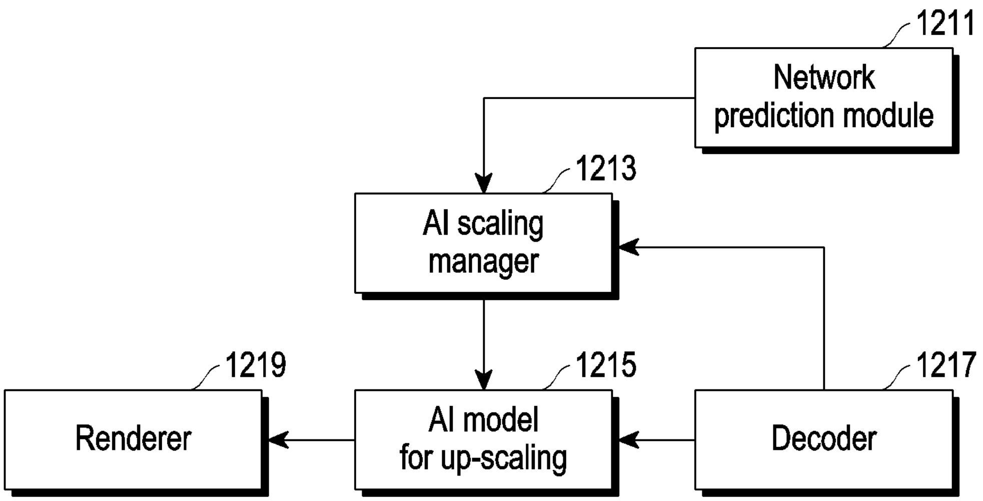
FIG. 12B is a view illustrating image reception by an electronic device according to an embodiment of the disclosure.

FIG. 12B is a view illustrating image reception by an electronic device according to an embodiment of the disclosure.

Referring to FIG. 12B, according to an embodiment of the disclosure, upon receiving the bitstream, the electronic device 101 (e.g., the processor 120) may decode the received bitstream using a decoder 1217. When receiving the bitstream, the electronic device 101 may execute a AI scaling manager 1213. The AI scaling manager 1213 may provide information (e.g., BPP) (or may be referred to as meta information) associated with the bitrate, which is a part of input values to a AI model 1215 for up-scaling. The bitrate is information used in the encoding process, and was not previously used by the receiving side. However, the electronic device 101 according to an embodiment may use the bitrate-related information as a part of the input values to the AI model 1215. Accordingly, even when receiving the bitstream, the electronic device 101 may identify information (e.g., BPP) associated with the bitrate. For example, the electronic device 101 may identify the bitrate based on information from a network prediction module 1211. The AI scaling manager 1213 may identify the BPP using the bitrate, the identified framerate, and resolution. The AI scaling manager 1213 may provide the identified BPP to the AI model 1215 for up-scaling. The AI model 1215 may receive the BPP provided from the AI scaling manager 1213 and the low-resolution image provided from the decoder 1217 as input values, and output the up-scaled high-resolution image. A renderer 1219 may render the high-resolution image. For example, the bitrate may be set to a previously used bitrate. For example, the bitrate may be set based on the bandwidth at the receiving side measured by the network prediction module 1211. For example, the bitrate initially used by the encoder 1207 may be shared.

According to an embodiment of the disclosure, the AI scaling manager 1213 of the receiving side may identify information (e.g., BPP) related to the bitstream in any one of the plurality of methods. For example, the AI scaling manager 1213 may select one of the BPP (e.g., the BPP according to Equation 1) associated with the communication environment or the BPP (e.g., the BPP according to Equation 5) associated with the average of the sizes of the encoded images and provide the selected BPP to the AI model 1215. In an example, when the number of the accumulated encoded images is less than a designated number K, the AI scaling manager 1213 may select the BPP (e.g., the BPP according to Equation 1) associated with the communication environment. The decoder 1217 may provide the received encoded frame size information to the AI scaling manager 1213, and accordingly, the AI scaling manager 1213 may identify the BPP (e.g., the BPP according to Equation 5) based on the information about the size of the encoded frame. In an example, the AI scaling manager 1213 may select the BPP (e.g., the BPP according to Equation 1) associated with the communication environment when the bitrate identified based on the network prediction module 1201 changes sharply (or when the communication environment changes sharply). In an example, when the packet loss exceeds a designated threshold loss value, the AI scaling manager 1213 may select the BPP (e.g., the BPP according to Equation 1) associated with the communication environment. The network prediction module 1211 may identify the packet loss and provide the packet loss to the AI scaling manager 1213, and accordingly, the AI scaling manager 1213 may identify whether the packet loss exceeds the designated threshold loss value. Meanwhile, the above-described selection conditions of the BPP are exemplary and are not limited thereto.

Figure 13A:
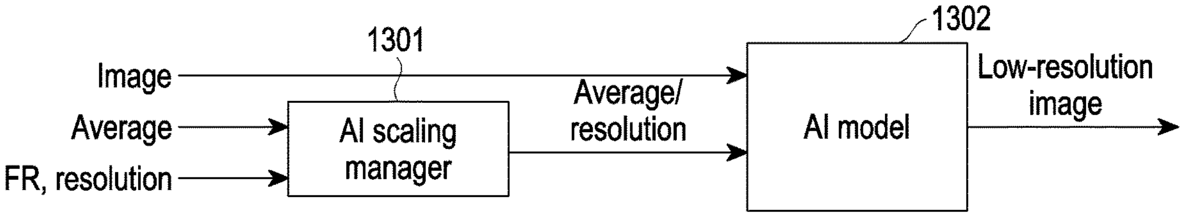
FIG. 13A is a view illustrating image transmission by an electronic device according to an embodiment of the disclosure.

FIG. 13A is a view illustrating image transmission by an electronic device according to an embodiment of the disclosure.

Referring to FIG. 13A, according to an embodiment of the disclosure, the electronic device 101 (e.g., the processor 120) may execute a AI scaling manager 1301 and an AI model 1302 for down-scaling. The relatively high-resolution image captured by the camera module 180 may be provided to the AI model 1302 through the AI scaling manager 1301, or may be provided directly from the camera module 180 to the AI model 1302. The AI scaling manager 1301 may receive the average value of the sizes of a designated number (e.g., K which may be a natural number of 1 or more) of encoded images. The AI scaling manager 1301 may receive codec parameters including the framerate and the resolution. The AI scaling manager 1301 may identify, e.g., the BPP (e.g., the BPP as shown in Equation 5) of the value obtained by dividing the average by the resolution. The AI scaling manager 1301 may provide the image and the BPP to the AI model 1302. The AI model 1302 may receive the image and the BPP as input values and output a low-resolution image. Meanwhile, in the embodiment of FIG. 13A, it has been described that the AI scaling manager 1301 selects to use the BPP of the value obtained by dividing the average by the resolution, but this is exemplary. For example, the AI scaling manager 1301 may select to use the BPP of the value obtained by dividing the average by the resolution, based on the number of pre-encoded images being greater than or equal to the designated number K. However, when the number of pre-encoded images is less than the designated number K, the AI scaling manager 1301 may be configured to use the value obtained by dividing the bitrate as shown in Equation 1 by the product of the framerate and the resolution (e.g., the BPP as shown in Equation 1). Alternatively, the AI scaling manager 1301 may select to use the BPP of the value obtained by dividing the average by the resolution based on the bitrate not changing rapidly, but when the bitrate changes rapidly, the AI scaling manager 1301 may be configured to use the value obtained by dividing the bitrate as shown in Equation 1 by the product of the framerate and the resolution (e.g., the BPP as shown in Equation 1).

Figure 13B:
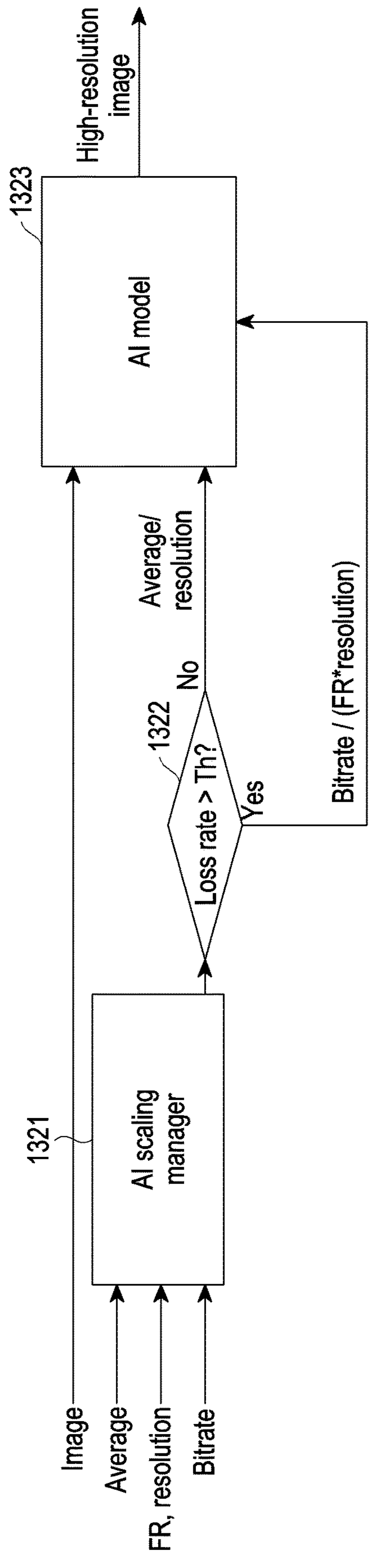
FIG. 13B is a view illustrating image reception by an electronic device according to an embodiment of the disclosure.

FIG. 13B is a view illustrating image reception by an electronic device according to an embodiment of the disclosure.

Referring to FIG. 13B, according to an embodiment of the disclosure, the electronic device 101 (e.g., the processor 120) may execute an AI scaling manager 1321 and a AI model 1323 for up-scaling. The AI model 1323 may receive an image having a relatively low-resolution. For example, the AI model 1323 may receive a relatively low-resolution image decoded by the decoder. The AI scaling manager 1321 may receive the average value of the sizes of a designated number (e.g., K which may be a natural number of 1 or more) of encoded images. For example, the decoder may identify the size of the received encoded image (or bitstream) and provide it to the AI scaling manager 1321, or may identify the average and provide it to the AI scaling manager 1321. It will be understood by one of ordinary skill in the art that when the size of the encoded image (or bitstream) received from the decoder is received, the AI scaling manager 1321 may be configured to identify the average. The AI scaling manager 1321 may receive codec parameters including the framerate and the resolution. The AI scaling manager 1321 may receive the predicted bitrate.

According to an embodiment of the disclosure, the AI scaling manager 1321 may identify whether the packet loss rate exceeds the threshold loss rate Th. When the packet loss rate is relatively large, there is a possibility that there is a difference between the average for the designated number K used on the transmitting side and the average for the designated number K used on the receiving side. Accordingly, when the packet loss rate exceeds the threshold loss rate Th (yes in 1322), the AI scaling manager 1321 may provide a value (e.g., the BPP according to Equation 1) obtained by dividing the bitrate by the product of the framerate and the resolution as a part of the input values to the AI model 1323. When the packet loss rate is less than or equal to the threshold loss rate Th (no in 1322), the AI scaling manager 1321 may provide a value obtained by dividing the average by the resolution (e.g., the BPP according to Equation 5) as a part of the input values to the AI model 1323. Accordingly, the AI model 1323 may receive the image and the BPP as input values, and may provide a high-resolution image corresponding thereto.

According to an embodiment of the disclosure, an electronic device 101 may comprise memory 130, a camera module 180, a communication module 190, and at least one processor 120 operatively connected to the memory 130, the camera module 180 and the communication module 190. The memory 130, when executed by the at least one processor 120, may cause the electronic device 101 to establish a call connection with a network based on the communication module 190. The memory 130, when executed by the at least one processor 120, may cause the electronic device 101 to identify a first image captured based on the camera module 180. The memory 130, when executed by the at least one processor 120, may cause the electronic device 101 to identify first information associated with a first bitrate corresponding to the first image, based on a communication environment between the network and the electronic device 101. The memory 130, when executed by the at least one processor 120, may cause the electronic device 101 to identify a second image corresponding to the first image output from an artificial intelligence model for down-scaling, trained to receive information associated with a high-resolution image and a bitrate as an input value to output a low-resolution image, by inputting the first image and the first information to the artificial intelligence model. The memory 130, when executed by the at least one processor 120, may cause the electronic device 101 to transmit the second image through the call connection based on the communication module 190.

According to an embodiment of the disclosure, the memory 130, when executed by the at least one processor 120, may cause the electronic device 101 to as at least part of identifying the first information associated with the first bitrate corresponding to the first image, identify a first bit per pixel (BPP) obtained by dividing the first bitrate by a product of a first framerate associated with the first image and a resolution associated with the first image, as the first information.

According to an embodiment of the disclosure, the memory 130, when executed by the at least one processor 120, may cause the electronic device 101 to, as at least part of identifying the first information associated with the first bitrate corresponding to the first image, identify the first BPP as the first information associated with the first bitrate based on at least one first condition being met.

According to an embodiment of the disclosure, the memory 130, when executed by the at least one processor 120, may cause the electronic device 101 to, as at least part of identifying the first information associated with the first bitrate corresponding to the first image, identify a second BPP obtained by dividing an average of sizes of a designated number of pre-encoded images by the resolution, as the first information, based on at least one second condition different from the at least one first condition being met or the at least one first condition being not met.

According to an embodiment of the disclosure, the memory 130, when executed by the at least one processor 120, may cause the electronic device 101 to, as at least part of transmitting the second image, generate a bitstream by encoding the second image. The memory 130, when executed by the at least one processor 120, may cause the electronic device 101 to, as at least part of transmitting the second image, transmit the bitstream through the call connection.

According to an embodiment of the disclosure, the memory 130, when executed by the at least one processor 120, may cause the electronic device 101 to identify the communication environment based on at least one of a one-way delay, a perceived bitrate, a packet loss rate, or a bandwidth.

According to an embodiment of the disclosure, the artificial intelligence model for down-scaling may include a first portion extracting a feature of the first image, a second portion extracting a feature of the first information, a multiplier cross-multiplying the feature of the first image and the feature of the first information, a third portion for enhancing a result of the cross-multiplying by the multiplier and configuring a residual image, a fourth portion for down-scaling the first image, and an adder for adding an output result of the third portion and an output result of the fourth portion. The result of adding by the adder may be provided as the second image.

According to an embodiment of the disclosure, the artificial intelligence model for down-scaling may be a ResNet. The first portion may include at least one convolution layer. The second portion may be a DenseNet. The third portion may include at least one convolution layer. The fourth portion may be a Bicubic down scaler.

According to an embodiment of the disclosure, a method for operating an electronic device 101 may comprise identifying a first image captured based on a camera module 180 of the electronic device 101. The method for operating the electronic device 101 may comprise identifying first information associated with a first bit rate corresponding to the first image, based on a communication environment between the network and the electronic device 101. The method for operating the electronic device 101 may comprise identifying a second image corresponding to the first image output from an artificial intelligence model for down-scaling, trained to receive information associated with a high-resolution image and a bitrate as an input value to output a low-resolution image, by inputting the first image and the first information to the artificial intelligence model. The method for operating the electronic device 101 may comprise transmitting the second image through the call connection based on a communication module 190 of the electronic device 101.

According to an embodiment of the disclosure, in a storage medium storing at least one computer-readable instruction, the at least one instruction may, when executed by at least one processor 120 of an electronic device 101, enable the electronic device 101 to perform at least one operation. The at least one operation may include identifying a first image captured based on a camera module 180 of the electronic device 101. The at least one operation may include identifying first information associated with a first bit rate corresponding to the first image, based on a communication environment between the network and the electronic device 101. The at least one operation may include identifying a second image corresponding to the first image output from an artificial intelligence model for down-scaling, trained to receive information associated with a high-resolution image and a bitrate as an input value to output a low-resolution image, by inputting the first image and the first information to the artificial intelligence model. The at least one operation may include transmitting the second image through the call connection based on a communication module 190 of the electronic device 101.

According to an embodiment of the disclosure, an electronic device 101 may comprise memory 130, a display module, a communication module 190, and at least one processor 120 operatively connected to the memory 130, the display module and the communication module 190. The memory 130, when executed by the at least one processor 120, may cause the electronic device 101 to establish a call connection with a network based on the communication module 190. The memory 130, when executed by the at least one processor 120, may cause the electronic device 101 to receive the first image through the call connection based on the communication module 190. The memory 130, when executed by the at least one processor 120, may cause the electronic device 101 to identify first information associated with a first bitrate corresponding to the first image, based on a communication environment between the network and the electronic device 101. The memory 130, when executed by the at least one processor 120, may cause the electronic device 101 to identify a second image corresponding to the first image output from an artificial intelligence model for up-scaling, trained to receive information associated with a low-resolution image and a bitrate as an input value to output a high-resolution image, by inputting the first image and the first information to the artificial intelligence model. The memory 130, when executed by the at least one processor 120, may cause the electronic device 101 to control the display module to display at least a portion of the second image.

According to an embodiment of the disclosure, the memory 130, when executed by the at least one processor 120, may cause the electronic device 101 to, as at least part of identifying the first information associated with the first bitrate corresponding to the first image, identify a first bit per pixel (BPP) obtained by dividing the first bitrate by a product of a first frame rate associated with the first image and a resolution associated with the first image, as the first information.

According to an embodiment of the disclosure, the memory 130, when executed by the at least one processor 120, may cause the electronic device 101 to, as at least part of identifying the first information associated with the first bitrate corresponding to the first image, identify the first BPP as the first information associated with the first bitrate based on at least one first condition being met.

According to an embodiment of the disclosure, the memory 130, when executed by the at least one processor 120, may cause the electronic device 101 to, as at least part of identifying the first information associated with the first bitrate corresponding to the first image, identify a second BPP obtained by dividing an average of sizes of a designated number of pre-encoded images by the resolution, as the first information, based on at least one second condition different from the at least one first condition being met or the at least one first condition being not met.

According to an embodiment of the disclosure, the memory 130, when executed by the at least one processor 120, may cause the electronic device 101 to, as at least part of receiving the first image, receive a bitstream through the call connection. The memory 130, when executed by the at least one processor 120, may cause the electronic device 101 to, as at least part of receiving the first image, identify the first image by decoding the bitstream.

According to an embodiment of the disclosure, the memory 130, when executed by the at least one processor 120, may cause the electronic device 101 to identify the communication environment based on at least one of a one way delay, a perceived bitrate, a packet loss rate, or a bandwidth.

According to an embodiment of the disclosure, the artificial intelligence model for up-scaling may include a first portion extracting a feature of the first image, a second portion extracting a feature of the first information, a multiplier cross-multiplying the feature of the first image and the feature of the first information, a third portion for enhancing a result of the cross-multiplying by the multiplier and configuring a residual image, a fourth portion for up-scaling the first image, and an adder for adding an output result of the third portion and an output result of the fourth portion. The result of adding by the adder may be provided as the second image.

According to an embodiment of the disclosure, the artificial intelligence model for down-scaling may be a ResNet. The first portion may include at least one convolution layer. The second portion may be a DenseNet. The third portion may include at least one convolution layer. The fourth portion may be a Bicubic down scaler.

According to an embodiment of the disclosure, a method for operating an electronic device 101 may comprise establishing a call connection with a network based on the communication module 190. The method for operating the electronic device 101 may comprise receiving a first image through the call connection based on a communication module 190 of the electronic device 101. The method for operating the electronic device 101 may comprise identifying first information associated with a first bit rate corresponding to the first image, based on a communication environment between the network and the electronic device 101. The method for operating the electronic device 101 may comprise identifying a second image corresponding to the first image output from an artificial intelligence model for up-scaling, trained to receive information associated with a low-resolution image and a bitrate as an input value to output a high-resolution image, by inputting the first image and the first information to the artificial intelligence model. The method for operating the electronic device 101 may comprise controlling a display module of the electronic device 101 to display at least a portion of the second image.

According to an embodiment of the disclosure, in a storage medium storing at least one computer-readable instruction, the at least one instruction may, when executed by at least one processor 120 of an electronic device 101, enable the electronic device 101 to perform at least one operation. The at least one operation may include receiving a first image through the call connection based on a communication module 190 of the electronic device 101. The at least one operation may include identifying first information associated with a first bit rate corresponding to the first image, based on a communication environment between the network and the electronic device 101. The at least one operation may include identifying a second image corresponding to the first image output from an artificial intelligence model for up-scaling, trained to receive information associated with a low-resolution image and a bitrate as an input value to output a high-resolution image, by inputting the first image and the first information to the artificial intelligence model. The at least one operation may include controlling a display module of the electronic device 101 to display at least a portion of the second image.

According to an embodiment of the disclosure, a method for training a first AI model for down-scaling and a second AI model for up-scaling comprises identifying training data including a first image which is a high-resolution image and first information associated with a bitrate. The training method may comprise identifying a second image, which is a low-resolution image, output from the first AI model, based on inputting the first image and the first information to the first AI model. The training method may comprise identifying a third image, which is a high-resolution image, output from the second AI model, based on inputting the second image and the first information to the second AI model. The training method may comprise identifying a fourth image by down-scaling the first image. The training method may comprise identifying a total loss based on a first loss corresponding to the first image and the third image and a second loss corresponding to the second image and the fourth image. The training method may comprise training at least a portion of the first AI model and the second AI model based on the total loss.

According to an embodiment of the disclosure, the first information associated with the bitstream may be a bit per pixel (BPP) obtained by dividing the bitrate by a product of a first framerate associated with the first image and a resolution associated with the first image.

According to an embodiment of the disclosure, the training method may comprise identifying a fifth image, which is a low-resolution image, output from the first AI model, based on inputting the first image and the first information to the first AI model. The training method may further comprise identifying a sixth image by encoding the fifth image and decoding a result of the encoding. The training method may comprise identifying a seventh image, which is a high-resolution image, output from the second AI model, based on inputting the sixth image and the first information to the second AI model. The training method may further comprise identifying an eighth image obtained by enhancing the first image. The training method may further comprise identifying a total loss based on the seventh image and the eighth image. The training method may further comprise training the second AI model based on the total loss.

According to an embodiment of the disclosure, a second loss corresponding to the second image and the fourth image may be a loss between images obtained by enhancing the second image and the fourth image.

According to an embodiment of the disclosure, an electronic device 101 for training a first AI model for down-scaling and a second AI model for up-scaling comprises memory 130 and at least one processor 120. The memory 130, when executed by the at least one processor 120, may cause the electronic device 101 to identify training data including a first image, which is a high-resolution image, and first information associated with a bitrate. The memory 130, when executed by the at least one processor 120, may cause the electronic device 101 to identify a second image, which is a low-resolution image, output from the first AI model, based on inputting the first image and the first information to the first AI model. The memory 130, when executed by the at least one processor 120, may cause the electronic device 101 to identify a third image, which is a high-resolution image, output from the second AI model, based on inputting the second image and the first information to the second AI model. The memory 130, when executed by the at least one processor 120, may cause the electronic device 101 to identify a fourth image by down-scaling the first image. The memory 130, when executed by the at least one processor 120, may cause the electronic device 101 to identify a fifth image by enhancing the fourth image. The memory 130, when executed by the at least one processor 120, may cause the electronic device 101 to identify a total loss based on a first loss corresponding to the first image and the third image and a second loss corresponding to the second image and the fifth image. The memory 130, when executed by the at least one processor 120, may cause the electronic device 101 to train at least a portion of the first AI model and the second AI model based on the total loss.

According to an embodiment of the disclosure, in a storage medium storing at least one computer-readable instruction, the at least one instruction may, when executed by at least one processor 120 of an electronic device 101, enable the electronic device 101 to perform at least one operation. The at least one operation may include identifying training data including a first image, which is a high-resolution image, and first information associated with a bitrate. The at least one operation may include identifying a second image, which is a low-resolution image, output from the first AI model, based on inputting the first image and the first information to the first AI model for down-scaling. The at least one operation may include identifying a third image, which is a high-resolution image, output from the second AI model, based on inputting the second image and the first information to the second AI model for up-scaling. The at least one operation may include identifying a fourth image by down-scaling the first image. The at least one operation may include identifying a fifth image by enhancing the fourth image. The at least one operation may include identifying a total loss based on a first loss corresponding to the first image and the third image and a second loss corresponding to the second image and the fifth image. The at least one operation may include training at least a portion of the first AI model and the second AI model based on the total loss.

The electronic device according to an embodiment of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

An embodiment of the disclosure may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The storage medium readable by the machine may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to an embodiment of the disclosure, each component (e.g., a module or a program) of the above-described components may include a single entity or multiple entities. Some of the plurality of entities may be separately disposed in different components. According to an embodiment of the disclosure, one or more of the above-described components may be omitted, or one or more other components may be added. Alternatively or Further, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:

memory storing instructions;

a camera module;

a communication module; and at least one processor operatively connected to the memory, the camera module and the communication module, wherein the instructions, when executed by the at least one processor, cause the electronic device to:

establish a call connection with a network based on the communication module, identify a first image captured based on the camera module, identify first information associated with a first bitrate corresponding to the first image, based on a communication environment between the network and the electronic device by identifying a first bit per pixel (BPP) obtained by dividing the first bitrate by a product of a first framerate associated with the first image and a resolution associated with the first image, as the first information, identify a second image corresponding to the first image output from an artificial intelligence model for down-scaling, trained to receive information associated with a high-resolution image and a bitrate as an input value to output a low-resolution image, by inputting the first image and the first information to the artificial intelligence model, and transmit the second image through the call connection based on the communication module.

2. The electronic device of claim 1, wherein the instructions, when executed by the at least one processor, cause the electronic device to, as at least part of identifying the first information associated with the first bitrate corresponding to the first image:

identify the first BPP as the first information associated with the first bitrate based on at least one first condition being met.

3. The electronic device of claim 2, wherein the instructions, when executed by the at least one processor, cause the electronic device to, as at least part of identifying the first information associated with the first bitrate corresponding to the first image:

identify a second BPP obtained by dividing an average of sizes of a designated number of pre-encoded images by the resolution, as the first information, based on at least one second condition different from the at least one first condition being met or the at least one first condition being not met.

4. The electronic device of claim 1, wherein the instructions, when executed by the at least one processor, cause the electronic device to, as at least part of transmitting the second image:

generate a bitstream by encoding the second image, and transmit the bitstream through the call connection.

5. The electronic device of claim 1, wherein the instructions, when executed by the at least one processor, cause the electronic device to, identify the communication environment based on at least one of a one-way delay, a perceived bitrate, a packet loss rate, or a bandwidth.

6. The electronic device of claim 1, wherein the artificial intelligence model for down-scaling includes, a first portion extracting a feature of the first image, a second portion extracting a feature of the first information, a multiplier cross-multiplying the feature of the first image and the feature of the first information, a third portion for enhancing a result of the cross-multiplying by the multiplier and configuring a residual image, a fourth portion for down-scaling the first image, and an adder for adding an output result of the third portion and an output result of the fourth portion, and wherein a result of adding by the adder is provided as the second image.

7. The electronic device of claim 6, wherein the artificial intelligence model for down-scaling is a ResNet, wherein the first portion includes at least one convolution layer, wherein the second portion is a DenseNet, wherein the third portion includes at least one convolution layer, and wherein the fourth portion is a Bicubic down scaler.

8. The electronic device of claim 1, wherein the instructions, when executed by the at least one processor, cause the electronic device to, identify training data including a first image, which is a high-resolution image, and first information associated with a bitrate, identify a second image, which is a low-resolution image, output from a first AI model for down-scaling, based on inputting the first image and the first information to the first AI model, identify a third image, which is a high-resolution image, output from a second AI model for up-scaling, based on inputting the second image and the first information to the second AI model, identify a fourth image by down-scaling the first image, identify a total loss based on a first loss corresponding to the first image and the third image and a second loss corresponding to the second image and the fourth image, and train at least a portion of the first AI model and the second AI model based on the total loss.

9. The electronic device of claim 8, wherein the instructions, when executed by the at least one processor, cause the electronic device to, identify a fifth image, which is a low-resolution image, output from the first AI model, based on inputting the first image and the first information to the first AI model, identify a sixth image by encoding the fifth image and decoding a result of the encoding, identify a seventh image, which is a high-resolution image, output from the second AI model, based on inputting the sixth image and the first information to the second AI model, identify an eighth image obtained by enhancing the first image, identify a total loss based on the seventh image and the eighth image, and train the second AI model based on the total loss.

10. An electronic device comprising:

memory storing instructions;

a display module;

a communication module; and at least one processor operatively connected to the memory, the display module and the communication module, wherein the instructions, when executed by the at least one processor, cause the electronic device to:

establish a call connection with a network based on the communication module, receive a first image through the call connection based on the communication module, identify first information associated with a first bitrate corresponding to the first image, based on a communication environment between the network and the electronic device, by identifying a first bit per pixel (BPP) obtained by dividing the first bitrate by a product of a first frame rate associated with the first image and a resolution associated with the first image, as the first information, identify a second image corresponding to the first image output from an artificial intelligence model for up-scaling, trained to receive information associated with a low-resolution image and a bitrate as an input value to output a high-resolution image, by inputting the first image and the first information to the artificial intelligence model, and control the display module to display at least a portion of the second image.

11. The electronic device of claim 10, wherein the instructions, when executed by the at least one processor, cause the electronic device to, as at least part of identifying the first information associated with the first bitrate corresponding to the first image:

identify the first BPP as the first information associated with the first bitrate based on at least one first condition being met.

12. The electronic device of claim 11, wherein the instructions, when executed by the at least one processor, cause the electronic device to, as at least part of identifying the first information associated with the first bitrate corresponding to the first image:

identify a second BPP obtained by dividing an average of sizes of a designated number of pre-encoded images by the resolution, as the first information, based on at least one second condition different from the at least one first condition being met or the at least one first condition being not met.

13. The electronic device of claim 10, wherein the instructions, when executed by the at least one processor, cause the electronic device to, as at least part of receiving the first image:

receive a bitstream through the call connection, and identify the first image by decoding the bitstream.

14. The electronic device of claim 10, wherein the instructions, when executed by the at least one processor, cause the electronic device to:

identify the communication environment based on at least one of a one way delay, a perceived bitrate, a packet loss rate, or a bandwidth.

15. The electronic device of claim 10, wherein the instructions, when executed by the at least one processor, cause the electronic device to:

identify training data including a first image, which is a high-resolution image, and first information associated with a bitrate, identify a second image, which is a low-resolution image, output from a first AI model for down-scaling, based on inputting the first image and the first information to the first AI model, identify a third image, which is a high-resolution image, output from a second AI model for up-scaling, based on inputting the second image and the first information to the second AI model, identify a fourth image by down-scaling the first image, identify a total loss based on a first loss corresponding to the first image and the third image and a second loss corresponding to the second image and the fourth image, and train at least a portion of the first AI model and the second AI model based on the total loss.

16. The electronic device of claim 15, wherein the instructions, when executed by the at least one processor, cause the electronic device to:

identify a fifth image, which is a low-resolution image, output from the first AI model, based on inputting the first image and the first information to the first AI model, identify a sixth image by encoding the fifth image and decoding a result of the encoding, identify a seventh image, which is a high-resolution image, output from the second AI model, based on inputting the sixth image and the first information to the second AI model, identify an eighth image obtained by enhancing the first image, identify a total loss based on the seventh image and the eighth image, and train the second AI model based on the total loss.

17. The electronic device of claim 16, wherein a second loss corresponding to the second image and the fourth image is a loss between images obtained by enhancing the second image and the fourth image.

18. One or more non-transitory computer-readable storage media storing at least one computer-readable instruction that, when executed by at least one processor of an electronic device, causes the electronic device to perform operations, the operations comprising:

establishing a call connection with a network based on a communication module of the electronic device;

identifying a first image captured based on a camera module of the electronic device;

identifying first information associated with a first bitrate corresponding to the first image, based on a communication environment between the network and the electronic device, by identifying a first bit per pixel (BPP) obtained by dividing the first bitrate by a product of a first framerate associated with the first image and a resolution associated with the first image, as the first information;

identifying a second image corresponding to the first image output from an artificial intelligence model for down-scaling, trained to receive information associated with a high-resolution image and a bitrate as an input value to output a low-resolution image, by inputting the first image and the first information to the artificial intelligence model; and transmitting the second image through the call connection based on the communication module.

* * * * *